US011859158B2

(12) United States Patent
Tollens et al.

(10) Patent No.: US 11,859,158 B2
(45) Date of Patent: Jan. 2, 2024

(54) HARD SURFACE CLEANING COMPOSITION AND METHOD OF IMPROVING SURFACE SHINE USING THE SAME

(71) Applicant: The Procter & Gamble Company, Cincinnati, OH (US)

(72) Inventors: Fernando Ray Tollens, Cincinnati, OH (US); Pauline Cuc Vu, Florence, KY (US); Brian Christopher Groendyke, Newport, KY (US); William Alexander Cynecki, Midland, MI (US); Daniel Ross Mayfield, Saginaw, MI (US); Anthony Schutz, Clinton Township, MI (US)

(73) Assignee: The Procter & Gamble Company, Cincinnati, OH (US)

( * ) Notice: Subject to any disclaimer, the term of this patent is extended or adjusted under 35 U.S.C. 154(b) by 247 days.

(21) Appl. No.: 17/110,408

(22) Filed: Dec. 3, 2020

(65) Prior Publication Data

US 2021/0163854 A1 Jun. 3, 2021

Related U.S. Application Data

(60) Provisional application No. 62/942,852, filed on Dec. 3, 2019.

(51) Int. Cl.

*C11D 1/62* (2006.01)
*C11D 1/72* (2006.01)

(Continued)

(52) U.S. Cl.

CPC ................ *C11D 3/43* (2013.01); *A47L 13/17* (2013.01); *A47L 13/20* (2013.01); *B08B 1/006* (2013.01);

(Continued)

(58) Field of Classification Search

CPC ....... C11D 1/66; C11D 3/2068; C11D 3/2006; C11D 1/62; C11D 17/041; C11D 17/042

(Continued)

(56) References Cited

U.S. PATENT DOCUMENTS

| | | | | |
|---|---|---|---|---|
| 6,299,520 B1 * | 10/2001 | Cheyne, III | A47L 17/08 | 451/532 |
| 6,693,070 B1 * | 2/2004 | Cheung | A01N 33/12 | 510/237 |

(Continued)

FOREIGN PATENT DOCUMENTS

| | | | | |
|---|---|---|---|---|
| EP | 1678284 A1 * | 7/2006 | A01N 33/12 |
| GB | 2429015 * | 2/2007 | C11D 1/72 |

(Continued)

*Primary Examiner* — Gregory R Delcotto
(74) *Attorney, Agent, or Firm* — Gary J. Foose

(57) ABSTRACT

A hard surface cleaning composition, methods of cleaning a hard surface with a low hysteresis composition and disposable premoistened pads for cleaning hard surfaces are provided. The hard surface cleaning composition includes from 0.01 wt. % to 7 wt. % of a solvent selected from the group consisting of a propylene glycol phenyl ether, a dipropylene glycol phenyl ethers and mixtures thereof and at least 92% water. The cleaning composition has a pH from about 3.5 to 9.5 and is free of anionic surfactant and alkanolamine.

12 Claims, 5 Drawing Sheets

(51) Int. Cl.

| | |
|---|---|
| ***C11D 3/43*** | (2006.01) |
| ***C11D 3/44*** | (2006.01) |
| ***C11D 3/30*** | (2006.01) |
| ***C11D 3/20*** | (2006.01) |
| ***C11D 3/22*** | (2006.01) |
| ***C11D 1/75*** | (2006.01) |
| ***A47L 13/20*** | (2006.01) |
| ***C11D 11/00*** | (2006.01) |
| ***B08B 1/00*** | (2006.01) |
| ***B08B 3/08*** | (2006.01) |
| ***A47L 13/17*** | (2006.01) |
| ***C11D 17/04*** | (2006.01) |
| ***C11D 1/66*** | (2006.01) |

(52) U.S. Cl.

CPC .................. *B08B 3/08* (2013.01); *C11D 1/62* (2013.01); *C11D 1/66* (2013.01); *C11D 1/75* (2013.01); *C11D 3/201* (2013.01); *C11D 3/2068* (2013.01); *C11D 3/222* (2013.01); *C11D 3/30* (2013.01); *C11D 11/0023* (2013.01); *C11D 17/041* (2013.01); *C11D 17/042* (2013.01); *C11D 17/049* (2013.01)

(58) Field of Classification Search

USPC ....... 510/191, 238, 421, 438, 439, 504, 505, 510/506

See application file for complete search history.

(56) References Cited

U.S. PATENT DOCUMENTS

| | | | | |
|---|---|---|---|---|
| 2002/0002125 | A1* | 1/2002 | Colurciello, Jr. | C11D 3/48 510/238 |
| 2009/0099057 | A1* | 4/2009 | DeDominicis | C11D 3/43 510/405 |
| 2014/0290695 | A1* | 10/2014 | Uchiyama | C11D 1/14 15/104.93 |
| 2016/0120387 | A1* | 5/2016 | Deleersnyder | A47L 13/17 15/104.93 |

FOREIGN PATENT DOCUMENTS

| | | | | | |
|---|---|---|---|---|---|
| GB | 2474260 | | * | 4/2011 | C11D 1/72 |
| WO | WO-0157174 | A1 | * | 8/2001 | A01N 37/36 |
| WO | WO-2004035726 | A1 | * | 4/2004 | C11D 17/0013 |
| WO | WO-2007144555 | A1 | * | 12/2007 | C11D 1/66 |
| WO | WO-2008068463 | A1 | * | 6/2008 | C11D 1/72 |

* cited by examiner

HARD SURFACE CLEANING COMPOSITION AND METHOD OF IMPROVING SURFACE SHINE USING THE SAME

FIELD

The present disclosure is generally directed to a hard surface cleaning composition and methods of improving surface shine and reducing streaks and water marks of a cleaning composition using the dewetting behaviour of low hydrophile-lipophile balance solvents; also known as hysteresis.

BACKGROUND

Hard surface cleaning compositions are used for cleaning and treating hard surfaces. Preferably, the hard surface cleaning composition is formulated to be an "all purpose" hard surface cleaning composition. That is, the hard surface cleaning composition is formulated to be suitable for cleaning as many different kinds of surfaces as possible. However, it historically has been challenging to formulate a hard surface cleaning composition which effectively cleans tiles, and more delicate surfaces such as wood, stainless steel, linoleum, marble, and the like. When cleaning particularly dirty floors, film and streak residues or water marks may be left behind which result in low shine, and an impression that the surface is not yet sufficiently clean. In addition, such floors, washed with diluted hard surface cleaning compositions tend to be slippery with a resultant increase in the risk of falls and similar accidents. As a result, the floor is sometimes rinsed again using fresh water, to remove such films and streaks or water marks in order to improve the impression of cleanliness.

Hence, a need remains for a composition which provides improved shine and reduced streaks and water marks, even after cleaning especially dirty floors.

SUMMARY

Aspects of the present disclosure include a hard surface cleaning composition that includes from 0.01 wt. % to 7 wt. % of a solvent selected from the group consisting of a propylene glycol phenyl ether, a dipropylene glycol phenyl ethers and mixtures thereof and at least 92% water. The cleaning composition has a pH from about 3.5 to 9.5 and is free of anionic surfactant and alkanolamine Aspects of the present disclosure also include a methods of cleaning a hard surfaces with reduced film and streak residues or water marks, the method comprising the steps of: wetting the hard surface with a cleaning composition, and removing the cleaning composition from the hard surface with a disposable dry cleaning wipe. The hard surface cleaning composition includes from 0.01 wt. % to 7 wt. % of a solvent selected from the group consisting of a propylene glycol phenyl ether, a dipropylene glycol phenyl ethers and mixtures thereof and at least 92% water. The cleaning composition has a pH from about 3.5 to 9.5 and is free of anionic surfactant and alkanolamine.

Aspects of the present disclosure also include disposable premoistened pads for cleaning hard surfaces that include a substrate and a liquid hard surface cleaning composition. The substrate is impregnated with the cleaning composition. The cleaning composition includes from 0.01 wt. % to 7 wt. % of a solvent selected from the group consisting of a propylene glycol phenyl ether, a dipropylene glycol phenyl ethers and mixtures thereof and at least 92% water. The cleaning composition has a pH from about 3.5 to 9.5 and is free of anionic surfactant and alkanolamine.

Aspects of the present disclosure also include cleaning implements that include a handle, a plastic head, a cleaning pad removably connectable with the plastic head, a reservoir connected with or separated from the handle; and a liquid hard surface cleaning composition. The cleaning composition includes from 0.01 wt. % to 7 wt. % of a solvent selected from the group consisting of a propylene glycol phenyl ether, a dipropylene glycol phenyl ethers and mixtures thereof and at least 92% water. The cleaning composition has a pH from about 3.5 to 9.5 and is free of anionic surfactant and alkanolamine.

DETAILED DESCRIPTION OF THE DRAWINGS

DETAILED DESCRIPTION

Figure 1A:
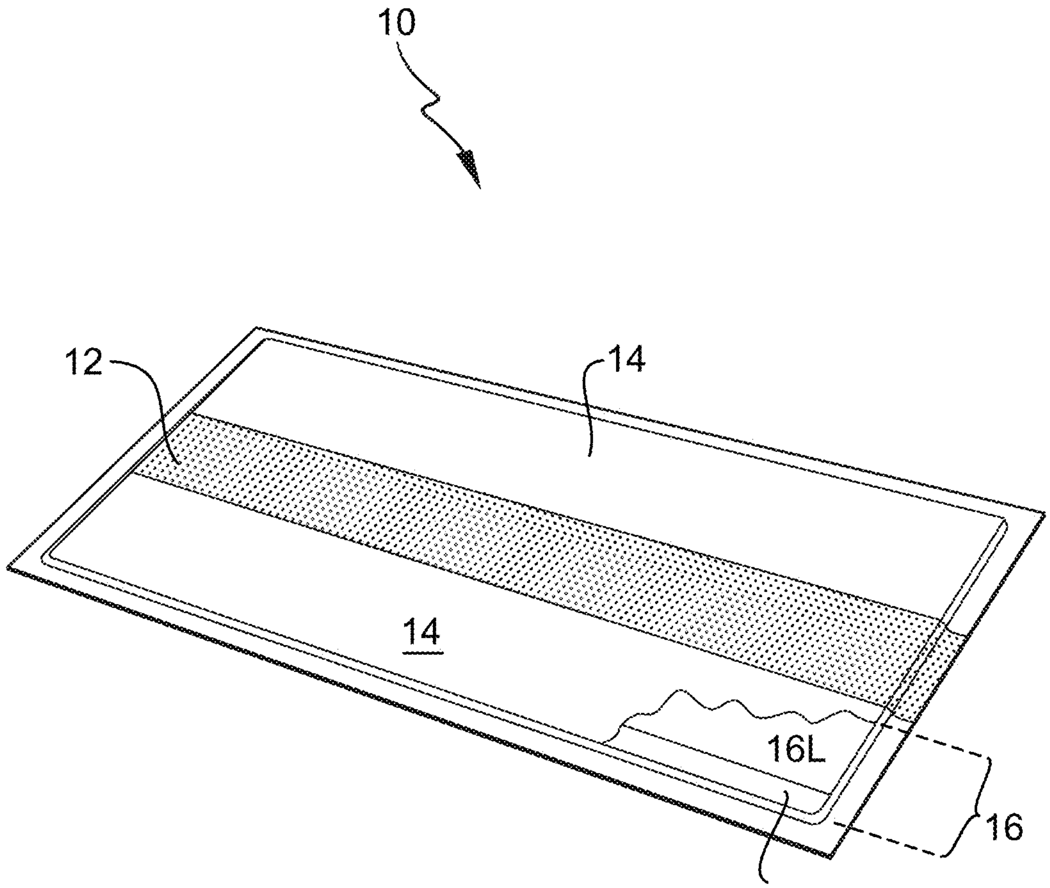
FIG. 1A is a top perspective view an exemplary cleaning pad according to the present invention shown partially in cutaway.

As defined herein, "essentially free of" a component means that no amount of that component is deliberately incorporated into the respective premix, or composition. Preferably, "essentially free of" a component means that no amount of that component is present in the respective premix, or composition, but may be present as trace impurities.

As used herein, "isotropic" means a clear mixture, having little or no visible haziness, phase separation and/or dispersed particles, and having a uniform transparent appearance.

As defined herein, "stable" means that no visible phase separation is observed for a premix kept at 25° C. for a period of at least two weeks, or at least four weeks, or greater than a month or greater than four months, as measured using the Floc Formation Test, described in USPA 2008/0263780 A1.

By "Low volatile organic compound hard surface cleaning composition", it is meant herein a finished product having low volatile organic compound ("VOC") content like, for example, a maximum of 0.5% by weight of the composition of VOCs, however, it is noted that fragrance is exempted from this value up to 2% by the weight of the finished product.

All percentages, ratios and proportions used herein are by weight percent of the premix, unless otherwise specified. All average values are calculated "by weight" of the premix, unless otherwise expressly indicated.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

Liquid Hard Surface Cleaning Compositions

By "liquid hard surface cleaning composition", it is meant herein a liquid composition for cleaning hard surfaces found in households, especially domestic households. Surfaces to be cleaned include kitchens and bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, steel, kitchen work surfaces, any plastics, wood, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments.

In a preferred embodiment, the liquid compositions herein are aqueous compositions. Therefore, they may comprise from 92% to 99.7% by weight of the total composition of water, preferably at least about 93 wt %, more preferably at least about 95 wt %, more preferably at least about 97 wt %, most preferably at least about 98 wt % water.

The compositions of the present disclosure preferably have a viscosity from lcps to 650 cps, more preferably of from 100 cps to 550 cps, more preferably from 150 cps to 450 cps, most preferably from 250 cps to 350 cps when measured at 20° C. with a AD1000 Advanced Rheometer from Atlas® shear rate 10 s−1 with a coned spindle of 40 mm with a cone angle 2° and a truncation of ±60 μm.

The pH is preferably from 3.5 to 9.5, more preferably from 5 to 8 and most preferably from 6 to 7.

It will be understood that the compositions herein may further comprise an acid or base to adjust pH as appropriate.

A suitable acid for use herein is an organic and/or an inorganic acid. A preferred organic acid for use herein has a pKa of less than 7. A suitable organic acid is selected from the group consisting of: citric acid, lactic acid, glycolic acid, maleic acid, malic acid, succinic acid, glutaric acid and adipic acid and mixtures thereof. A suitable inorganic acid can be selected from the group consisting of: hydrochloric acid, sulphuric acid, phosphoric acid and mixtures thereof.

A typical level of such acids, when present, is from 0.001% to 1.0% by weight of the total composition, preferably from 0.005% to 0.5% and more preferably from 0.01% to 0.05%.

A suitable base to be used herein is an organic and/or inorganic base. Suitable bases for use herein are the caustic alkalis, such as sodium hydroxide, potassium hydroxide and/or lithium hydroxide, and/or the alkali metal oxides such, as sodium and/or potassium oxide or mixtures thereof. A preferred base is a caustic alkali, more preferably sodium hydroxide and/or potassium hydroxide.

Other suitable bases include ammonia, ammonium carbonate, $K_2CO_3$, $Na_2CO_3$ and alkanolamines (such as monoethanolamine, triethanolamine, aminomethylpropanol, and mixtures thereof).

Typical levels of such bases, when present, are from 0.001% to 1.0% by weight of the total composition, preferably from 0.005% to 0.5% and more preferably from 0.01% to 0.05%.

Solvent

The liquid hard surface cleaning compositions preferably comprises a propylene phenyl glycol esthers solvent. The solvent comprises a propylene glycol phenyl ether or dipropylene glycol phenyl ethers solvent and a combination thereof with an HLB value of 5.5 to 6.5.

It was found that a composition having a propylene phenyl glycol esthers solvent with an HLB value of 5.5 to 6.5 delivered good cleaning with an unexpectedly low streaks and water marks as compared to compositions with traditional solvent systems.

Without being bound by theory, a composition having a solvent or solvents with the preferred HLB value for example, propylene glycol phenyl ether or dipropylene glycol phenyl ethers solvent, provides sufficient water solubility for solution stability and enough oil compatibility for oil or lipid solubility. Propylene glycol phenyl ether and dipropylene glycol phenyl ethers solvents or solvents deliver optimum oil solubility for cleaning, soil dissolution, and absorption while maintaining a low level of streaks and water marks coming from their ability to dewett during the drying process.

A phenyl glycol ether having an HLB between 5.5 and 6.5 may be selected from the group consisting of: propylene glycol phenyl ether and dipropylene glycol phenyl ether, and combinations thereof. Exemplary glycol ethers having an HLB between 5.5 and 6.5 are DOWANOL™ PPH, DOWANOL™ DiPPH Glycol Ether, and DOWANOL™ CNTR from the Dow Chemical Company.

The phenyl glycol ether solvent may be present at a level of 0.05 wt. % to 3.50 wt. %, more preferably 0.1 wt. % to 1.5 wt. %, most preferably 0.3 wt. % to 0.9 wt. %, by weight of the overall composition.

The composition may comprise less than 0.5 wt. % ethanol, more preferably less than 0.4 wt. % ethanol, and most preferably less than 0.3 wt. % ethanol. Without wishing to be bound by theory, it is believed that higher levels of ethanol negatively impacting the hysteresis of the composition and increase the streaking of the composition on the hard surface.

Figure 4:
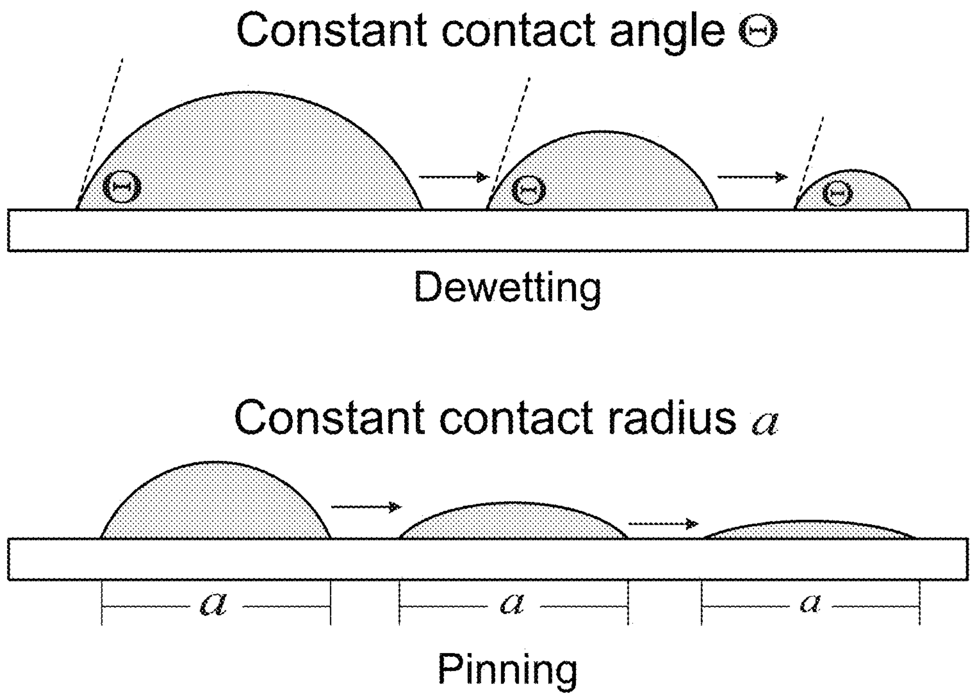
FIG. 4 is a illustrates the processes pinning and dewetting.

During the cleaning process, surfaces may undergo four transformations, cycles or stages: application of the solution to wet the surface, wetting and spreading of the solution on the surface, optional removal of the solution from the surface that can include absorption into a cleaning substrate, and drying of any residual solution which on horizontals surfaces, like floors, occurs mainly by evaporation. However, during the drying cycle the wetting and spreading characteristics of the solution, which are controlled by the interaction between fluid and the surface interface, are important for the final appearance of the cleaning surface. The effect of the wetting behavior of the solution during the drying cycle is a phenomenal that is not well understood. During the drying cycle the solution evaporates forming beads and depending on their chemical composition these beads would evaporate by pining or dewetting. As shown in FIG. 4, these two phenomena, pinning or dewetting, can significantly impact spotting and/or streaking of the solution left behind. When a solution evaporates through a pinning process, the area and the radius of the bead contacting the surface remains constant while the volume and the contact angle between the fluid and the surface decreases. This results in streaks and/or water marks of the size of the area or radius of the original bead which has a negative impact in cleaning appearance and shine. On the other hand, when a solution evaporates through a dewetting process, the area, the radius of the bead contacting the surface, and its volume decreases while the contact angle between the fluid and the surface remains contact. This results in the reduction of the area and radius of the original bead which reduces its foot print on the surface as the beads evaporate resulting in smaller and less visible streaks and water marks. One parameter that is important for the dewetting behaviour of the solution is its degree of hysterisis, which is defined as the substraction of its advancing contact minus its receiding contact angle. The hysterisis of the solution controls how the solution wets or spread and dewetts or recede on the surface. This hysterisis is a dynamic process with its advancing component controlling wetting, for example during the wetting cycle; and its receding component controlling dewetting during the drying process. High hysteresis solutions, or solutions with higher advancing contact angle component, have a higher tendency to spread and are less prone to dewett. While low hysteresis solutions, or solutions with lower advancing contact angle or higher receding contact angle component, have a higher tendency to recede and are more prone to deweet. It has been found that solutions containing high hydrophobic solvents with a Hydrophile-Lipophile Balance between 5.5 to 6.5, such as phenyl glycol ethers, more specifically propylene phenyl glycol ethers results in low hysteresis less than 30°, more preferably less than 20°, and most preferably less than 10° offer dewetting benefits. Without being bound by theory, it is believed that optimum dewetting and shine results are found with a solutions preferably having a hysteresis than lower than 30°, more preferably lower than 20°, and most preferably lower than 10°. This benefit is of particular importance in cleaning application without a rinse or that are not completely absorbed during the cleaning process.

The benefit of these solvents can also show benefits when the composition comprises an antibacterial (as discussed further herein), such as a quaternary ammonium. Specifically, antibacterial compositions, such as those with quaternary ammonium are known to be poor dewetters and tend to cause stickiness problems if used at high concentration or if left behind on the cleaning surface. The benefit with antibacterial formulations can be further improved when the pad or wipe contains airlaid cellulose because, without being bound by theory, the negative charge sites in the cellulose bind to the quaternary ammonium and reduce their free or expressed concentration that can reach the cleaning surface reducing their negative impact in cleaning while still delivering high micro efficacy.

Non-Ionic Surfactant

The liquid hard surface cleaning composition of the present disclosure may include an amine oxide surfactant a non-ionic surfactant. The non-ionic surfactant may be present at a level of 0.005 wt. % to 0.5 wt. %, more preferably 0.01 wt. % to 0.1 wt. %, most preferably 0.04 wt. % to 0.06 wt. %, by weight of the overall composition.

Suitable non-ionic surfactants include amine oxide surfactants which include: R1R2R3NO wherein each of $R_1$, $R_2$ and $R_3$ is independently a saturated or unsaturated, substituted or unsubstituted, linear or branched hydrocarbon chain having from 10 to 30 carbon atoms. Preferred amine oxide surfactants are amine oxides having the following formula: $R_1R_2R_3NO$ wherein $R_1$ is an hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. $R_1$ may be a saturated or unsaturated, substituted or unsubstituted linear or branched hydrocarbon chain.

A highly preferred amine oxide is $C_{12}$-$C_{14}$ dimethyl amine oxide, commercially available from Albright & Wilson, $C_{12}$-$C_{14}$ amine oxides commercially available under the trade name Genaminox® LA from Clariant or AROMOX® DMC from AKZO Nobel.

Another suitable non-ionic surfactants are ethoxylated alkoxylated nonionic surfactant. The ethoxylated alkoxylated nonionic surfactant is preferably selected from the group consisting of: esterified alkyl alkoxylated surfactant; alkyl ethoxy alkoxy alcohol, wherein the alkoxy part of the molecule is preferably propoxy, or butoxy, or propoxybutoxy; polyoxyalkylene block copolymers, and mixtures thereof.

The preferred ethoxylated alkoxylated nonionic surfactant is an esterified alkyl alkoxylated surfactant of general formula (I):

(I)

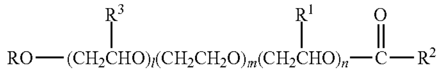

where

R is a branched or unbranched alkyl radical having 8 to 16 carbon atoms, preferably from 10 to 16 and more preferably from 12 to 15;

R3, R1 independently of one another, are hydrogen or a branched or unbranched alkyl radical having 1 to 5 carbon atoms; preferably R3 and R1 are hydrogen R2 is an unbranched alkyl radical having 5 to 17 carbon atoms; preferably from 6 to 14 carbon atoms l, n independently of one another, are a number from 1 to 5 and m is a number from 8 to 50; and Preferably, the weight average molecular weight of the ethoxylated alkoxylated nonionic surfactant of formula (I) is from 950 to 2300 g/mol, more preferably from 1200 to 1900 g/mol.

R is preferably from 12 to 15, preferably 13 carbon atoms. R3 and R1 are preferably hydrogen. Component l is preferably 5. n is preferably 1. m is preferably from 13 to 35, more preferably 15 to 25, most preferably 22. R2 is preferably from 6 to 14 carbon atoms.

The hard surface cleaning composition of the invention provides especially high shine when the esterified alkyl akoxylated surfactant is as follows: R has from 12 to 15, preferably 13 carbon atoms, R3 is hydrogen, R1 is hydrogen, component l is 5, n is 1, m is from 15 to 25, preferably 22 and R2 has from 6 to 14 carbon atoms and the alcohol ethoxylated has an aliphatic alcohol chain containing from 10 to 14, more preferably 13 carbon atoms and from 5 to 8, more preferably 7 molecules of ethylene oxide.

Preferably, the ethoxylated alkoxylated nonionic surfactant can be a polyoxyalkylene copolymer. The polyoxyalkylene copolymer can be a block-heteric ethoxylated alkoxylated nonionic surfactant, though block-block surfactants are preferred. Suitable polyoxyalkylene block copolymers include ethylene oxide/propylene oxide block polymers, of formula (II):

(EO)x(PO)y(EO)x, or (II)

(PO)x(EO)y(PO)x (II)

wherein EO represents an ethylene oxide unit, PO represents a propylene oxide unit, and x and y are numbers detailing the average number of moles ethylene oxide and propylene oxide in each mole of product. Such materials tend to have higher molecular weights than most non-ionic surfactants, and as such can range between 1000 and 30000 g/mol, although the molecular weight should be above 2200 and preferably below 13000. A preferred range for the molecular weight of the polymeric non-ionic surfactant is from 2400 to 11500 Daltons. BASF (Mount Olive, N.J.) manufactures a suitable set of derivatives and markets them under the Pluronic trademarks. Examples of these are Pluronic (trademark) F77, L62 and F88 which have the molecular weight of 6600, 2450 and 11400 g/mol respectively. An especially preferred example of a useful polymeric non-ionic surfactant is Pluronic (trademark) F77.

Other suitable ethoxylated alkoxylated nonionic surfactants are described in Chapter 7 of Surfactant Science and Technology, Third Edition, Wiley Press, ISBN 978-0-471-68024-6.

The ethoxylated alkoxylated nonionic surfactant preferably provides a wetting effect of from 15 to 350 s, more preferably from 60 to 200 s, even more preferably from 75 to 150 s. The wetting effect is measured according to EN 1772, using 1 g/l of the ethoxylated alkoxylated nonionic surfactant in distilled water, at 23° C., with 2 g soda/l.

The ethoxylated alkoxylated nonionic surfactants preferably are low foaming non-ionic surfactants that are alkoxylated and include unbranched fatty alcohols that may contain high amounts of alkene oxide and ethylene oxide. For example, preferred ethoxylated alkoxylated nonionic surfactants may include those sold by BASF under the "Plurafac" trademark, especially Plurafac LF 131 (wetting effect of 25 s), LF 132 (wetting effect of 70 s), LF 231 (wetting effect of 40 s), LF 431 (wetting effect of 30 s), LF 1530 (wetting effect>300 s), LF 731 (wetting effect of 100 s), LF 1430 (wetting effect>300 s) and LF 7319 (wetting effect of 100 s).

The ethoxylated alkoxylated nonionic surfactants preferably are not hydrogenated and, therefore, the fatty alcohol chains do not terminate in a hydrogen group. Examples of such hydrogenated non-ionic surfactants include Plurafac 305 and Plurafac 204.

Another suitable non-ionic surfactants are alkoxylated nonionic surfactants, alkyl polyglycosides, and mixture thereof.

Suitable alkoxylated nonionic surfactants include primary $C_6$-$C_{16}$ alcohol polyglycol ether i.e. ethoxylated alcohols having 6 to 16 carbon atoms in the alkyl moiety and 4 to 30 ethylene oxide (EO) units. When referred to for example $C_{9-14}$ it is meant average carbons and alternative reference to for example EO8 is meant average ethylene oxide units.

Suitable alkoxylated nonionic surfactants are according to the formula RO-$(A)_n$H, wherein: R is a $C_6$ to $C_{18}$, preferably a $C_8$ to $C_{16}$, more preferably a $C_8$ to $C_{12}$ alkyl chain, or a $C_6$ to $C_{28}$ alkyl benzene chain; A is an ethoxy or propoxy or butoxy unit, and wherein n is from 1 to 30, preferably from 1 to 15 and, more preferably from 4 to 12 even more preferably from 5 to 10. Preferred R chains for use herein are the $C_8$ to $C_{22}$ alkyl chains. Even more preferred R chains for use herein are the $C_9$ to $C_{12}$ alkyl chains. R can be linear or branched alkyl chain.

Suitable ethoxylated nonionic surfactants for use herein are Dobanol® 91-2.5 (HLB=8.1; R is a mixture of $C_9$ and $C_{11}$ alkyl chains, n is 2.5), Dobanol® 91-10 (HLB=14.2; R is a mixture of $C_9$ to $C_{11}$ alkyl chains, n is 10), Dobanol® 91-12 (HLB=14.5 ; R is a mixture of $C_9$ to $C_{11}$ alkyl chains, n is 12), Greenbentine DE80 (HLB=13.8, 98 wt % C10 linear alkyl chain, n is 8), Marlipal 10-8 (HLB=13.8, R is a C10 linear alkyl chain, n is 8), Lialethl® 11-5 (R is a $C_{11}$ alkyl chain, n is 5), Isalchem® 11-5 (R is a mixture of linear and branched C11 alkyl chain, n is 5), Lialethl® 11-21 (R is a mixture of linear and branched $C_{11}$ alkyl chain, n is 21), Isalchem® 11-21 (R is a $C_{11}$ branched alkyl chain, n is 21), Empilan® KBE21 (R is a mixture of $C_{12}$ and $C_{14}$ alkyl chains, n is 21) or mixtures thereof. Preferred herein are Dobanol® 91-5, Neodol® 11-5, Lialethl® 11-21 Lialethl® 11-5 Isalchem® 11-5 Isalchem® 11-21 Dobanol® 91-8, or Dobanol® 91-10, or Dobanol® 91-12, or mixtures thereof. These Dobanol®/Neodol® surfactants are commercially available from SHELL. These Lutensol® surfactants are commercially available from BASF and these Tergitol® surfactants are commercially available from Dow Chemicals.

Suitable chemical processes for preparing the alkoxylated nonionic surfactants for use herein include condensation of corresponding alcohols with alkylene oxide, in the desired proportions. Such processes are well known to the person skilled in the art and have been extensively described in the art, including the OXO process and various derivatives thereof. Suitable alkoxylated fatty alcohol nonionic surfactants, produced using the OXO process, have been marketed under the tradename NEODOL® by the Shell Chemical Company. Alternatively, suitable alkoxylated nonionic surfactants can be prepared by other processes such as the Ziegler process, in addition to derivatives of the OXO or Ziegler processes.

Preferably, said alkoxylated nonionic surfactant is a $C_{9-11}$ EO5 alkylethoxylate, $C_{12-14}$ EO5 alkylethoxylate, a $C_{11}$ EO5 alkylethoxylate, $C_{12-14}$ EO21 alkylethoxylate, or a $C_{9-11}$ EO8 alkylethoxylate or a mixture thereof. Most preferably, said alkoxylated nonionic surfactant is a $C_{11}$ EO5 alkylethoxylate or a $C_{9-11}$ EO8 alkylethoxylate or a mixture thereof.

Another suitable non-ionic surfactants are Alkyl polyglycosides, which are biodegradable nonionic surfactants which are well known in the art. Suitable alkyl polyglycosides can have the general formula $C_nH_{2n+1}O(C_6H_{10}O_5)_xH$ wherein n is preferably from 9 to 16, more preferably 11 to 14, and x is preferably from 1 to 2, more preferably 1.3 to 1.6. Such alkyl polyglycosides provide a good balance between antifoam activity and detergency. Alkyl polyglycoside surfactants are commercially available in a large variety. An example of a very suitable alkyl poly glycoside product is Planteren APG 600, which is essentially an aqueous dispersion of alkyl polyglycosides wherein n is about 13 and x is about 1.4.

The additional nonionic surfactant is preferably a low molecular weight nonionic surfactant, having a molecular weight of less than 950 g/mol, more preferably less than 500 g/mol.

Another suitable non-ionic surfactants are suitable zwitterionic surfactants. Zwitterionic surfactants typically contain both cationic and anionic groups in substantially equivalent proportions so as to be electrically neutral at the pH of use. The typical cationic group is a quaternary ammonium group, other positively charged groups like phosphonium, imidazolium and sulfonium groups can be used. The typical anionic hydrophilic groups are carboxylates and sulfonates, although other groups like sulfates, phosphonates, and the like can be used.

Some common examples of zwitterionic surfactants (such as betaine/sulphobetaine surfacants) are described in U.S. Pat. Nos. 2,082,275, 2,702,279 and 2,255,082. For example Coconut dimethyl betaine is commercially available from Seppic under the trade name of Amonyl 265®. Lauryl betaine is commercially available from Albright & Wilson under the trade name Empigen BB/L®. A further example of betaine is Lauryl-imminodipropionate commercially available from Rhodia under the trade name Mirataine H2C-HA®.

Sulfobetaine surfactants are particularly preferred, since they can improve soap scum cleaning. Examples of suitable sulfobetaine surfactants include tallow bis(hydroxyethyl) sulphobetaine, cocoamido propyl hydroxy sulphobetaines which are commercially available from Rhodia and Witco, under the trade name of Mirataine CBS® and ReWoteric AM CAS 15® respectively.

Another suitable non-ionic surfactants are amphoteric surfactants. Amphoteric surfactants can be either cationic or anionic depending upon the pH of the composition. Suitable amphoteric surfactants include dodecylbeta-alanine, N-alkyltaurines such as the one prepared by reacting dodecylamine with sodium isethionate, as taught in U.S. Pat. No. 2,658,072, N-higher alkylaspartic acids such as those taught in U.S. Pat. No. 2,438,091, and the products sold under the trade name "Miranol", as described in U.S. Pat. No. 2,528,378. Other suitable additional surfactants can be found in McCutcheon's Detergents and Emulsifers, North American Ed. 1980.

Copolymer:

The cleaning composition may comprise from 0.005% to 1.5%, more preferably from 0.01% to 1%, yet more preferably from 0.01% to 5%, most preferably from 0.01 to 0.06% by weight of the cleaning composition, of a copolymer that comprises monomers selected from the group comprising monomers of formula (III) (Monomer A) and monomers of formula (IVa-IVd) (Monomer B) (hereinafter referred to as "the copolymer"). The copolymer comprises from 60 to 99%, preferably from 70 to 95% and especially from 80 to 90% by weight of at least one monoethylenically unsaturated polyalkylene oxide monomer of the formula (III) (monomer A)

$$H_2C{=}CR^1{-}X{-}Y{-}\!\left(R^2{-}O\right)_n\!{-}R^3 \qquad \text{(III)}$$

wherein Y of formula (III) is selected from —O— and —NH—; if Y of formula (III) is —O—, X of formula (III) is selected from —$CH_2$— or —CO—, if Y of formula (III) is —NH—, X of formula (III) is —CO—; $R^1$ of formula (III) is selected from hydrogen, methyl, and mixtures thereof; $R^2$ of formula (III) is independently selected from linear or branched $C_2$-$C_6$-alkylene radicals, which may be arranged blockwise or randomly; $R^3$ of formula (III) is selected from hydrogen, $C_1$-$C_4$-alkyl, and mixtures thereof; n of formula (III) is an integer from 5 to 100, preferably from 10 to 70 and more preferably from 20 to 50.

The copolymer comprises from 1 to 40%, preferably from 2 to 30% and especially from 5 to 20% by weight of at least one quaternized nitrogen-containing monoethylenically unsaturated monomer of formula (IVa-IVd) (monomer B).

The monomers are selected such that the copolymer has a weight average molecular weight (Mw) of from 5,000 to 500,000 g/mol, preferably from greater than 7,000 to 150,000 g/mol and especially from 10,000 to 80,000 g/mol.

The copolymer preferably has a net positive charge at a pH of 3 or above.

The copolymer for use in the present disclosure may further comprise monomers C and/or D. Monomer C may comprise from 0% to 15%, preferably from 0 to 10% and especially from 1 to 7% by weight of the copolymer of an anionic monoethylenically unsaturated monomer.

Monomer D may comprise from 0% to 40%, preferably from 1 to 30% and especially from 5 to 20% by weight of the copolymer of other non-ionic monoethylenically unsaturated monomers.

Preferred copolymers according to the present disclosure comprise, as copolymerized Monomer A, monoethylenically unsaturated polyalkylene oxide monomers of formula (III) in which Y of formula (III) is —O—; X of formula (III) is —CO—; $R^1$ of formula (III) is hydrogen or methyl; $R^2$ of formula (III) is independently selected from linear or branched $C_2$-$C_4$-alkylene radicals arranged blockwise or randomly, preferably ethylene, 1,2- or 1,3-propylene or mixtures thereof, particularly preferably ethylene; $R^3$ of formula (III) is methyl; and n is an integer from 20 to 50.

Monomer A

A monomer A for use in the copolymer of the present disclosure may be, for example:

(a) reaction products of (meth)acrylic acid with polyalkylene glycols which are not terminally capped, terminally capped at one end by alkyl radicals; and (b) alkenyl ethers of polyalkylene glycols which are not terminally capped or terminally capped at one end by alkyl radicals.

Preferred monomer A is the (meth)acrylates and the allyl ethers, where the acrylates and primarily the methacrylates are particularly preferred. Particularly suitable examples of the monomer A are:

(a) methylpolyethylene glycol (meth)acrylate and (meth)acrylamide, methylpolypropylene glycol (meth)acrylate and (meth)acrylamide, methylpolybutylene glycol (meth)acrylate and (meth)acrylamide, methylpoly(propylene oxide-co-ethylene oxide) (meth)acrylate and (meth)acrylamide, ethylpolyethylene glycol (meth)acrylate and (meth)acrylamide, ethylpolypropylene glycol (meth)acrylate and (meth)acrylamide, ethylpolybutylene glycol (meth)acrylate and (meth)acrylamide and ethylpoly(propylene oxide-co-ethylene oxide) (meth)acrylate and (meth)acrylamide, each with 5 to 100, preferably 10 to 70 and particularly preferably 20 to 50, alkylene oxide units, where methylpolyethylene glycol acrylate is preferred and methylpolyethylene glycol methacrylate is particularly preferred;

(b) ethylene glycol allyl ethers and methylethylene glycol allyl ethers, propylene glycol allyl ethers and methylpropylene glycol allyl ethers each with 5 to 100, preferably 10 to 70 and particularly preferably 20 to 50, alkylene oxide units.

The proportion of Monomer A in the copolymer according to the present disclosure is 60% to 99% by weight, preferably 70% to 95%, more preferably from 80% to 90% by weight of the copolymer.

Monomer B

A monomer B that is particularly suitable for the copolymer of the present disclosure includes the quaternization products of 1-vinylimidazoles, of vinylpyridines, of (meth)acrylic esters with amino alcohols, in particular N,N-di-$C_1$-$C_4$-alkylamino-$C_2$-$C_6$-alcohols, of amino-containing (meth)acrylamides, in particular N,N-di-$C_1$-$C_4$-alkyl-amino-$C_2$-$C_6$-alkylamides of (meth)acrylic acid, and of diallylalkylamines, in particular diallyl-$C_1$-$C_4$-alkylamines.

Suitable monomers B have the formula IVa to IVd:

(IVa)

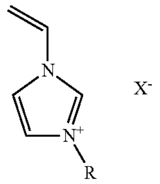

(IVb)

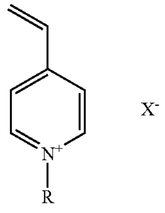

(IVc)

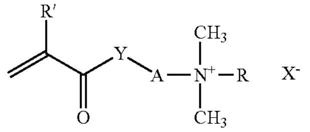

(IVd)

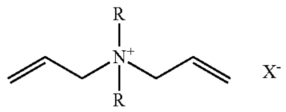

wherein R of formula IVa to IVd is selected from $C_1$-$C_4$-alkyl or benzyl, preferably methyl, ethyl or benzyl; R' of formula IVc is selected from hydrogen or methyl; Y of formula IVc is selected from —O— or —NH—; A of formula IVc is selected from $C_1$-$C_6$-alkylene, preferably straight-chain or branched $C_2$-$C_4$-alkylene, in particular 1,2-ethylene, 1,3- and 1,2-propylene or 1,4-butylene; X− of formula IVa to IVd is selected from halide, such as iodide and preferably chloride or bromide, $C_1$-$C_4$-alkyl sulfate, preferably methyl sulfate or ethyl sulfate, $C_1$-$C_4$-alkylsulfonate, preferably methylsulfonate or ethylsulfonate, $C_1$-$C_4$-alkyl carbonate; and mixtures thereof.

Specific examples of preferred monomer B that may be utilized in the present disclosure are:

(a) 3-methyl-1-vinylimidazolium chloride, 3-methyl-1-vinylimidazolium methyl sulfate, 3-ethyl-1-vinylimidazolium ethyl sulfate, 3-ethyl-1-vinylimidazolium chloride and 3-benzyl-1-vinylimidazolium chloride;

(b) 1-methyl-4-vinylpyridinium chloride, 1-methyl-4-vinylpyridinium methyl sulfate and 1-benzyl-4-vinylpyridinium chloride;

(c) 3-methacrylamido-N,N,N-trimethylpropan-1-aminium chloride, 3-acryl-N,N,N-trimethylpropan-1-aminium chloride, 3-acryl -N,N,N-trimethylpropan-1-aminium methylsulfate, 3-methacryl-N,N,N-trimethylpropan-1-aminium chloride, 3-methacryl-N,N,N-trimethylpropan-1-aminium methylsulfate, 2-acrylamido-N,N,N-trimethylethan-1-aminium chloride, 2-acryl-N,N,N-trimethylethan-1-aminium chloride, 2-acryl-N,N,N-trimethylethan-1-aminium methyl sulfate, 2-methacryl-N,N,N-trimethylethan-1-aminium chloride, 2-methacryl-N,N,N-trimethylethan-1-aminium methyl sulfate, 2-acryl-N,N-dimethyl-N-ethylethan-1-aminium ethylsulfate, 2-methacryl-N,N-dimethyl-N-ethylethan-1-aminium ethylsulfate, and (d) dimethyldiallylammonium chloride and diethyldiallylammonium chloride.

A preferred monomer B is selected from 3-methyl-1-vinylimidazolium chloride, 3-methyl-1-vinylimidazolium methyl sulfate, 3-methacryl-N,N,N-trimethylpropan-1-aminium chloride, 2-methacryl-N,N,N-trimethylethan-1-aminium chloride, 2-methacryl-N,N-dimethyl-N-ethylethan-1-aminium ethylsulfate, and dimethyldiallylammonium chloride.

The copolymer according to the present disclosure comprises 1% to 40% by weight, preferably 2% to 30%, and especially preferable from 5 to 20% by weight of the copolymer, of Monomer B. The weight ratio of Monomer A to Monomer B is preferably equal to or greater than 2:1, preferably 3:1 to 5:1.

Monomer C

As optional components of the copolymer of the present disclosure, monomers C and D may also be utilized. Monomer C is selected from anionic monoethylenically unsaturated monomers. Suitable monomer C may be selected from:

(a) α,β-unsaturated monocarboxylic acids which preferably have 3 to 6 carbon atoms, such as acrylic acid, methacrylic acid, 2-methylenebutanoic acid, crotonic acid and vinylacetic acid, preference being given to acrylic acid and methacrylic acid;

(b) unsaturated dicarboxylic acids, which preferably have 4 to 6 carbon atoms, such as itaconic acid and maleic acid, anhydrides thereof, such as maleic anhydride;

(c) ethylenically unsaturated sulfonic acids, such as vinylsulfonic acid, acrylamido-propanesulfonic acid, methallylsulfonic acid, methacrylsulfonic acid, m- and p-styrenesulfonic acid, (meth)acrylamidomethanesulfonic acid, (meth)acrylamidoethanesulfonic acid, (meth)acrylamidopropanesulfonic acid, 2-(meth)acrylamido-2-methylpropanesulfonic acid, 2-acrylamido-2-butanesulfonic acid, 3-methacrylamido-2-hydroxypropanesulfonic acid, methanesulfonic acid acrylate, ethanesulfonic acid acrylate, propanesulfonic acid acrylate, allyloxybenzenesulfonic acid, methallyloxybenzenesulfonic acid and 1-allyloxy-2-hydroxypropanesulfonic acid; and (d) ethylenically unsaturated phosphonic acids, such as vinylphosphonic acid and m- and p-styrenephosphonic acid.

The anionic Monomer C can be present in the form of water soluble free acids or in water-soluble salt form, especially in the form of alkali metal and ammonium, in particular alkylammonium, salts, and preferred salts being the sodium salts.

A preferred Monomer C may be selected from acrylic acid, methacrylic acid, maleic acid, vinylsulfonic acid, 2-(meth) acrylamido-2-methylpropanesulfonic acid and vinylphosphonic acid, particular preference being given to acrylic acid, methacrylic acid and 2-acrylamido-2-methylpropanesulfonic acid.

The proportion of monomer C in the copolymer of the present disclosure can be up to 15% by weight, preferably from 1% to 5% by weight of the copolymer.

If monomer C is present in the copolymer of the present disclosure, then, the molar ratio of monomer B to monomer C is greater than 1. The weight ratio of Monomer A to monomer C is preferably equal to or greater than 4:1, more preferably equal to or greater than 5:1. Additionally, the weight ratio of monomer B to monomer C is equal or greater than 2:1, and even more preferable from 2.5:1

Monomer D

As an optional component of the copolymer of the present disclosure, monomer D may also be utilized. Monomer D is selected from nonionic monoethylenically unsaturated monomers selected from:

(a) esters of monoethylenically unsaturated $C_3$-$C_6$-carboxylic acids, especially acrylic acid and methacrylic acid, with monohydric $C_1$-$C_{22}$-alcohols, in particular $C_1$-$C_{16}$-alcohols; and hydroxyalkyl esters of monoethylenically unsaturated $C_3$-$C_6$-carboyxlic acids, especially acrylic acid and methacrylic acid, with divalent $C_2$-$C_4$-alcohols, such as methyl (meth)acrylate, ethyl (meth)acrylate, n-butyl (meth)acrylate, sec-butyl (meth)acrylate, tert-butyl (meth)acrylate, ethylhexyl (meth)acrylate, decyl (meth)acrylate, lauryl (meth) acrylate, isobornyl (meth)acrylate, cetyl (meth)acrylate, palmityl (meth)acrylate and stearyl (meth)acrylate, hydroxyethyl (meth)acrylate, hydroxypropyl (meth)acrylate and hydroxybutyl (meth)acrylate;

(b) amides of monoethylenically unsaturated $C_3$-$C_6$-carboxylic acids, especially acrylic acid and methacrylic acid, with $C_1$-$C_{12}$-alkylamines and di($C_1$-$C_4$-alkyl)amines, such as N-methyl(meth)acrylamide, N,N-dimethyl (meth)acrylamide, N-ethyl(meth)acrylamide, N-propyl (meth)acrylamide, N-tert-butyl(meth)acrylamide, N-tert-octyl(meth)acrylamide and N-undecyl(meth) acrylamide, and (meth)acrylamide;

(c) vinyl esters of saturated $C_2$-$C_{30}$-carboxylic acids, in particular $C_2$-$C_{14}$-carboxylic acids, such as vinyl acetate, vinyl propionate, vinyl butyrate, vinyl 2-ethylhexanoate and vinyl laurate;

(d) vinyl $C_1$-$C_{30}$-alkyl ethers, in particular vinyl $C_1$-$C_{18}$-alkyl ethers, such as vinyl methyl ether, vinyl ethyl ether, vinyl n-propyl ether, vinyl isopropyl ether, vinyl n-butyl ether, vinyl isobutyl ether, vinyl 2-ethylhexyl ether and vinyl octadecyl ether;

(e) N-vinylamides and N-vinyllactams, such as N-vinylformamide, N-vinyl-N-methyl-formamide, N-vinylacetamide, N-vinyl-N-methylacetamide, N-vinylimidazol, N-vinylpyrrolidone, N-vinylpiperidone and N-vinylcaprolactam;

(f) aliphatic and aromatic olefins, such as ethylene, propylene, $C_4$-$C_{24}$-α-olefins, in particular $C_4$-$C_{16}$-α-olefins, e.g. butylene, isobutylene, diisobutene, styrene and α-methylstyrene, and also diolefins with an active double bond, e.g. butadiene;

(g) unsaturated nitriles, such as acrylonitrile and methacrylonitrile.

A preferred monomer D is selected from methyl (meth) acrylate, ethyl (meth)acrylate, (meth)acrylamide, vinyl acetate, vinyl propionate, vinyl methyl ether, N-vinylformamide, N-vinylpyrrolidone, N-vinylimidazole and N-vinylcaprolactam. N-vinylimidazol is particularly preferred.

If the monomer D is present in the copolymer of the present disclosure, then the proportion of monomer D may be up to 40%, preferably from 1% to 30%, more preferably from 5% to 20% by weight of the copolymer.

Preferred copolymers of the present disclosure include:

Formula V

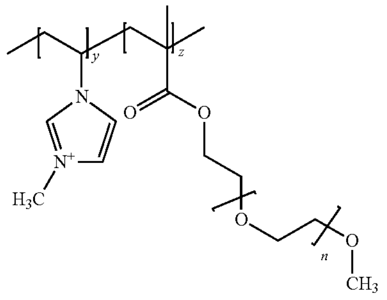

Formula VII

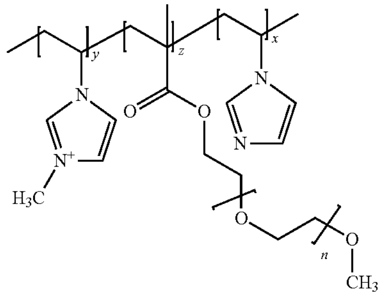

wherein indices y and z are such that the monomer ratio (z:y) is from 3:1 to 20:1 and the indices x and z are such that the monomer ratio (z:x) is from 1.5:1 to 20:1, and the polymer has a weight average molecular weight of from 20,000 to 500,000 g/mol, preferably from greater than 25,000 to 150,000 g/mol and especially from 30,000 to 80,000 g/mol.

The copolymers according to the present disclosure can be prepared by free-radical polymerization of the Monomers A and B and if desired C and/or D. The free-radical polymerization of the monomers can be carried out in accordance with all known methods, preference being given to the processes of solution polymerization and of emulsion polymerization. Suitable polymerization initiators are compounds which decompose thermally or photochemically (photoinitiators) to form free radicals, such as benzophenone, acetophenone, benzoin ether, benzyl dialkyl ketones and derivatives thereof.

The polymerization initiators are used according to the requirements of the material to be polymerized, usually in amounts of from 0.01% to 15%, preferably 0.5% to 5% by weight based on the monomers to be polymerized, and can be used individually or in combination with one another.

Instead of a quaternized Monomer B, it is also possible to use the corresponding tertiary amines. In this case, the quaternization is carried out after the polymerization by reacting the resulting copolymer with alkylating agents, such as alkyl halides, dialkyl sulfates and dialkyl carbonates, or benzyl halides, such as benzyl chloride. Examples of suitable alkylating agents which may be mentioned are, methyl chloride, bromide and iodide, ethyl chloride and bromide, dimethyl sulfate, diethyl sulfate, dimethyl carbonate and diethyl carbonate.

The anionic monomer C can be used in the polymerization either in the form of the free acids or in a form partially or completely neutralized with bases. Specific examples that may be listed are: sodium hydroxide solution, potassium hydroxide solution, sodium carbonate, sodium hydrogen carbonate, ethanolamine, diethanolamine and triethanolamine.

To limit the molar masses of the copolymers according to the present disclosure, customary regulators can be added during the polymerization, e.g. mercapto compounds, such as mercaptoethanol, thioglycolic acid and sodium disulfite. Suitable amounts of regulator are 0.1% to 5% by weight based on the monomers to be polymerized.

Quaternary Compound

The liquid hard surface cleaning composition may comprise a quaternary compound. Preferably, the liquid hard surface cleaning composition comprises the quaternary compound at a level of from 0.001 to 2% wt %, more preferably from 0.002 to 0.5 wt %, most preferably from 0.005 wt % to 01 wt % of the composition.

Traditionally, compositions comprising quaternary compounds tend to leave unsightly filming and/or streaking on the treated surfaces. However, compositions as presently disclosed surprisingly provide improved shine and reduced streaking. Without being bound to theory this improved shine benefit is a result of the dewetting property of the solvent. Furthermore, the compositions disclosed provide high antibacterial benefit delivering 5 logs micro efficacy while still delivering high shine. In the case of premoisten wipes, without being bound to theory, the cleaning and shine benefit are improved when the pad contains cellulose, preferentially between 50 to 200 gsm, more preferentially between 80 to 150 gsm, so that the negative sites of the cellulose bind some of the quaternary compounds reducing the expressed or release level of the quaternary compounds and thereby reducing their negative impacts on cleaning, shine and haze while maintaining its micro bacterial elimination efficacy.

Quaternary compounds useful herein are preferably selected from the group consisting of C6-C18 alkyltrimethylammonium chlorides, C6-C18dialkyldimethylammonium chlorides, and mixtures thereof. Preferably, the quaternary compound is selected from the group consisting of a C8-C12 alkyltrimethylammonium chloride, a C8-C12 dialkyldimethylammonium chloride, and mixtures thereof. Most preferably, the quaternary compound is C10 dialkyldimethylammonium chloride.

Non-limiting examples of useful quaternary compounds include: (1) Maquat® (available from Mason), and Hyamine® (available from Lonza); (2) di(C6-C14)alkyl di short chain (C1-4 alkyl and/or hydroxyalkl) quaternary such as Uniquat® and Bardac® products of Lonza, (3) N-(3-chloroallyl) hexaminium chlorides such as Dowicil® and Dowicil® available from Dow; and (4) di(C8-C12)dialkyl dimethyl ammonium chloride, such as didecyldimethylammonium chloride (Bardac 22, Uniquat 2250 or Bardac 2250), and dioctyldimethylammonium chloride (Bardac 2050).

The quaternary compounds preferably are not benzyl quats. An example of such benzyl quat includes alkyl dimethyl benzyl ammonium chloride (Uniquat QAC).

Nitrogen-Containing Polymer

The liquid hard surface cleaning composition may comprise a nitrogen-containing polymer. Nitrogen-containing polymers useful herein include polymers that contain amines (primary, secondary, and tertiary), amine-N-oxide, amides, urethanes, and/or quaternary ammonium groups. When present, it is important that the polymers herein contain nitrogen-containing groups that tend to strongly interact with the surface being treated in order to displace any present cationic quaternary compound from the surface.

Preferably, the polymers herein contain basic nitrogen groups. Basic nitrogen groups include primary, secondary, and tertiary amines capable of acting as proton acceptors. Thus, the preferred polymers herein can be nonionic or cationic, depending upon the pH of the solution. Polymers useful herein can include other functional groups, in addition to nitrogen groups. The preferred polymers herein are also essentially free of, or free of, quaternary ammonium groups.

Preferably, the polymers herein are branched polymers, especially highly branched polymers including comb, graft, starburst, and dendritic structures. Preferably, the polymers herein are not linear polymers.

The nitrogen-containing polymers herein can be an unmodified or modified polyamine, especially an unmodified or modified polyalkyleneimine. Preferably, the nitrogen containing polymers herein are modified polyamines. Poly ($C_2$-$C_{12}$ alkyleneimines) include simple polyethyleneimines and polypropyleneimines as well as more complex polymers containing these polyamines. Polyethyleneimines are common commercial materials produced by polymerization of aziridine or reaction of (di)amines with alkylenedichlorides. Polypropyleneimines are also included herein.

Although modified polyamines are preferred, linear or branched polyalkyleneimines, especially polyethyleneimines or polypropyleneimines, can be suitable in the present compositions to mitigate filming and/or streaking resulting from such compositions containing quaternary compounds. Branched polyalkyleneimines are preferred to linear polyalkyleneimines. Suitable polyalkyleneimines typically have a molecular weight of from about 1,000 to about 30,000 Daltons, and preferably from about 4,000 to about 25,000 Daltons. Such polyalkyleneimines are free of any ethoxylated and/or propoxylated groups, as it has been found that ethoxylation or propoxylation of polyalkyleneimines reduces or eliminates their ability to mitigate the filming and/or streaking problems caused by compositions containing quaternary compounds.

In preferred low-surfactant compositions for use in no-rinse cleaning methods, such compositions typically comprise nitrogen-containing polymer at a level of from about 0.005% to about 1%, preferably from about 0.005% to about 0.3%, and more preferably from about 0.005% to about 0.1%, by weight of the composition.

Examples of preferred modified polyamines useful as nitrogen-containing polymers herein are branched polyethyleneimines with a molecular weight of about 25,000 Daltons, and Lupasol® SK and Lupasol® SK(A) available from BASF.

Additional Polymers

The liquid hard surface cleaning composition may comprise an additional polymer. It has been found that the presence of a specific polymer as described herein, when present, allows further improving the grease removal performance of the liquid composition due to the specific sudsing/foaming characteristics they provide to the composition. Suitable polymers for use herein are disclosed in co-pending EP patent application EP2272942 (09164872.5) and granted European patent EP2025743 (07113156.9).

The polymer can be selected from the group consisting of: a vinylpyrrolidone homopolymer (PVP); a polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof.

Typically, the liquid hard surface cleaning composition may comprise from 0.001% to 1.0% by weight of the total composition of said polymer, preferably from 0.005% to 0.5%, more preferably from 0.01% to 0.05% and most preferably from 0.01% to 0.03%.

Fatty Acid

The liquid hard surface cleaning composition may comprise a fatty acid as a highly preferred optional ingredient, particularly as suds supressors. Fatty acids are desired herein as they reduce the sudsing of the liquid composition when the composition is rinsed off the surface to which it has been applied.

Suitable fatty acids include the alkali salts of a $C_8$-$C_{24}$ fatty acid. Such alkali salts include the metal fully saturated salts like sodium, potassium and/or lithium salts as well as the ammonium and/or alkylammonium salts of fatty acids, preferably the sodium salt. Preferred fatty acids for use herein contain from 8 to 22, preferably from 8 to 20 and more preferably from 8 to 18 carbon atoms.

Suitable fatty acids may be selected from caprylic acid, capric acid, lauric acid, myristic acid, palmitic acid, stearic acid, oleic acid, and mixtures of fatty acids suitably hardened, derived from natural sources such as plant or animal esters (e.g., palm oil, olive oil, coconut oil, soybean oil, castor oil, tallow, ground oil, whale and fish oils and/or babassu oil. For example coconut fatty acid is commercially available from KLK OLEA under the name PALMERAB1211.

Typically, the liquid hard surface cleaning composition may comprise up to 0.5% by weight of the total composition of said fatty acid, preferably from 0.05% to 0.3%, more preferably from 0.05% to 0.2% and most preferably from 0.07% to 0.1% by weight of the total composition of said fatty acid.

Branched Fatty Alcohol

The liquid hard surface cleaning composition may comprise a branched fatty alcohol, particularly as suds suppressors. Suitable branched fatty alcohols include the 2-alkyl alkanols having an alkyl chain comprising from 6 to 16, preferably from 7 to 13, more preferably from 8 to 12, most preferably from 8 to 10 carbon atoms and a terminal hydroxy group, said alkyl chain being substituted in the α position (i.e., position number 2) by an alkyl chain comprising from 1 to 10, preferably from 2 to 8 and more preferably 4 to 6 carbon atoms. Such suitable compounds are commercially available, for instance, as the Isofol® series such as Isofol® 12 (2-butyl octanol) or Isofol® 16 (2-hexyl decanol) commercially available from Sasol Typically, the liquid hard surface cleaning composition may comprise up to 2.0% by weight of the total composition of said branched fatty alcohol, preferably from 0.10% to 1.0%, more preferably from 0.1% to 0.8% and most preferably from 0.1% to 0.5%.

Perfumes

The liquid hard surface cleaning compositions preferably comprise a perfume. Suitable perfumes provide an olfactory aesthetic benefit and/or mask any "chemical" odor that the product may have.

Other Optional Ingredients

The liquid hard surface cleaning compositions may comprise a variety of other optional ingredients depending on the technical benefit aimed for and the surface treated. Suitable optional ingredients for use herein include builders, other polymers, buffers, bactericides, hydrotropes, colorants, stabilizers, radical scavengers, abrasives, soil suspenders, brighteners, anti-dusting agents, dispersants, dye transfer inhibitors, pigments, silicones and/or dyes.

Cleaning Pad

The liquid hard surface cleaning composition may be used in combination with a cleaning pad of the present disclosure. The cleaning pad may be dry and may contact a surface wetted with a cleaning composition, or the cleaning pad may be pre-moistened. The cleaning pad may comprise one or more layers.

Figure 1B:
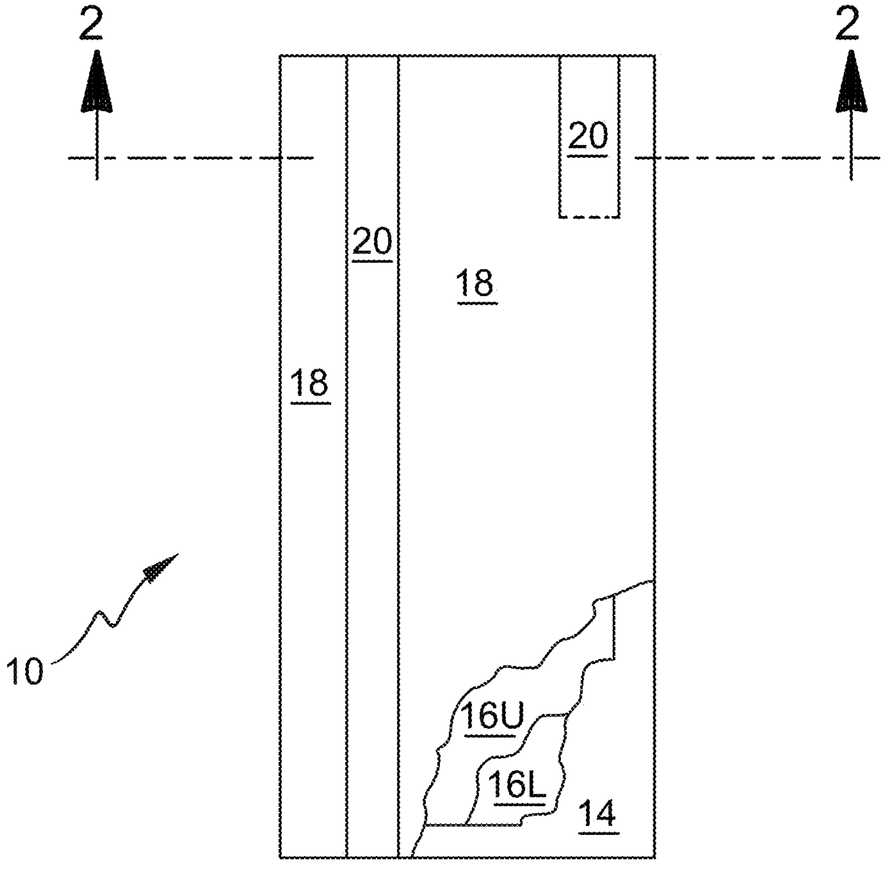
FIG. 1B is a bottom plan view of the cleaning pad of FIG. 1A, shown partially in cutaway and having one attachment strip truncated for clarity.
Figure 2:
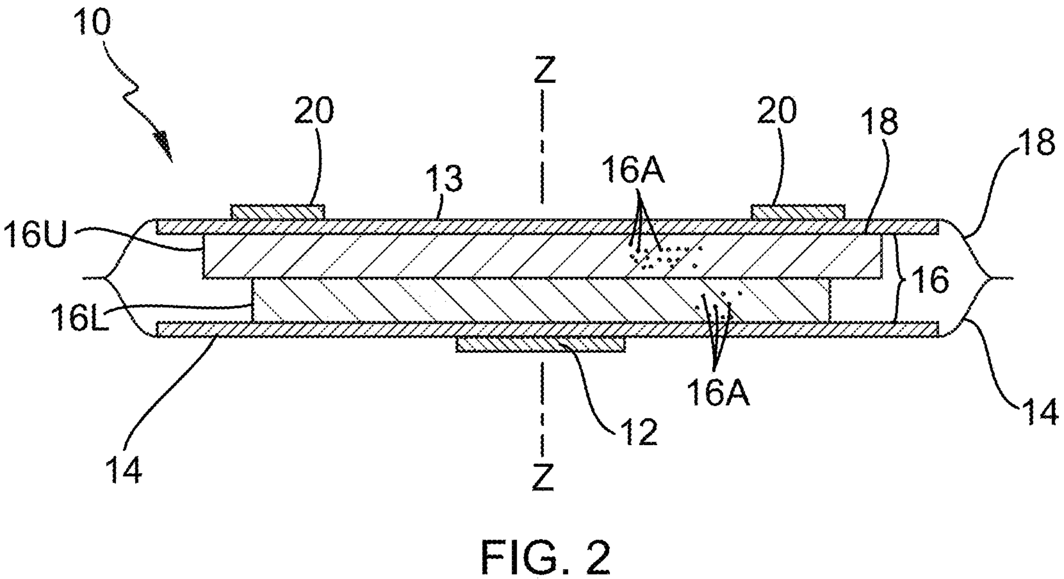
FIG. 2 is a schematic, vertical sectional view taken along lines 2-2 of FIG. 1B.

Referring to FIGS. 1A, 1B and 2, the cleaning pad 10 may comprise plural layers, to provide for absorption and storage of cleaning fluid and other liquids deposited on the target surface. The target surface will be described herein as a floor, although one of skill will recognize the invention is not so limited. The target surface can be any hard surface, such as a table or countertop, from which it is desired to absorb and retain liquids such as spill, cleaning solutions, etc.

The cleaning pad 10 may comprise a liquid pervious floor sheet 14 which contacts the floor during cleaning and preferably provides a desired coefficient of friction during cleaning. An absorbent core 16, preferably comprising an absorbent gelling material ("AGM") 16A is disposed on, and optionally joined to an inwardly facing surface of the floor sheet 14. The floor sheet may have an absorbency of at least 30%, more preferably at least 35%. It is to be appreciated that if the cleaning pad is to be used to clean a surface other than a floor, the floor sheet may be the sheet that contacts the surface to be cleaned.

The floor sheet of the cleaning pad may have a thickness from about 1 mm to about 5 mm, more preferably about 1.5 mm to about 3.0 mm and most preferably about 1.2 mm.

A smoothing strip 12 may be disposed on the outwardly facing surface of the floor sheet 14. Optionally, a back sheet 18 may be joined to the core 16 opposite the floor sheet 14, to provide for attachment of the cleaning pad 10 to an implement 30. The back sheet 18 may have an outwardly facing surface with one or more attachment strips 20 to particularly facilitate attachment to an implement 30. The cleaning pad 10 may be generally planar and define an XY plane and associated X, Y axes. The Z axis is perpendicular thereto and generally vertical when the cleaning pad 10 is in use on a floor.

If desired, the core 16 may comprise AGM 16A to increase the absorbent capacity of the cleaning pad 10. The AGM 16A may be in the form of particles may be distributed within the cleaning pad 10 in such a manner to avoid rapid absorbency and absorb fluids slowly, to provide for the most effective use of the cleaning pad 10. The AGM 16A also entraps dirty liquid absorbed from the floor, preventing redeposition. If desired foam absorbent material or fibrous material may be incorporated into the core 16.

Examining the cleaning pad 10 in more detail, the cleaning pad 10 may comprise plural layers disposed in a laminate. The lowest, or downwardly facing outer layer, may comprise apertures to allow for transmission of liquid therethrough and to promote the scrubbing of the target surface. One, two or more cores 16 layers may provide for storage of the liquids and may comprise the absorbent gelling materials. The cleaning pad 10 may have an absorbent capacity of at least 10, 15, or 20 grams of cleaning solution per gram of dry cleaning pad 10, as set forth in commonly assigned U.S. Pat. Nos. 6,003,191 and 6,601,261.

The optional top, or upwardly facing layer, is a back sheet 18, and may be liquid impervious in order to minimize loss of absorbed fluids and to protect the user's hand if the cleaning pad 10 is used without an implement 30. The top layer may further provide for releasable attachment of the cleaning pad 10 to a cleaning implement 30. The top layer may be made of a polyolefinic film, such as LDPE. A suitable back sheet 18 comprises a PE/PP film having a basis weight of 10 to 30 gsm.

The optional top, or upwardly facing layer, is a back sheet 18, and may be liquid impervious in order to minimize loss of absorbed fluids and to protect the user's hand if the cleaning pad 10 is used without an implement 30. This top layer may also be pervious to liquid and made of a polyolefinic nonwoven to provide a soft feel for the user. The top layer may further provide for releasable attachment of the cleaning pad 10 to a cleaning implement 30. The impervious top layer may be made of a polyolefinic film, such as LDPE. A suitable back sheet 18 comprises a PE/PP film having a basis weight of 10 to 30 gsm. For a liquid pervious top layer, it may comprise a polyolefinic nonwoven, such as a PP nonwoven.

Attached to the back sheet 18 may be one or more optional attachment strips 20. The attachment strips 20 may comprise adhesive, preferably pressure sensitive adhesive, or may comprise loops for removable attachment to complementary hooks on an implement 30. Suitable loop attachment strips 20 may comprise a laminate of PE film and Nylon loops.

The back sheet 18 and floor sheet 14 may be peripherally joined, as is known in the art. This arrangement creates a pocket for securely holding the core 16. The core 16 may be juxtaposed with, and optionally joined to the respective inwardly facing surfaces of the floor sheet 14 and back sheet 18.

The core 16 may comprise a single layer or two or more layers. If plural layers are selected for the core 16, the width of the layers may decrease as the floor sheet 14 is approached, as shown. The core 16 may comprise airlaid cellulose and optionally polymer fiber, as available from Glatfelter of York, PA. If two airlaid cellulose core 16 layers are selected, each layer of the core 16 may have a basis weight of at least about 75, 100, 125, 150, 175, 200, or 225 gsm and less than about 300 gsm.

Preferably each layer of the core 16 comprises AGM 16A. The AGM 16A may absorb at least 10, 15 or 20 times its own weight. The AGM 16A may be blown into the airlaid core 16 layer during manufacture as is known in the art. Suitable AGM 16A is available as Z3070G from Evonik of Essen, Germany. Arlaid material containing a gradient AGM 16A distribution is available from Glatfelter of York, PA.

The gradient distribution AGM 16A may be achieved by using more than one forming head. For example, an airfelt/AGM 16A line may have three forming heads. The first head may distribute a relatively large amount of AGM 16A relative to the cellulose distributed from that head. The second forming head may distribute a less amount of AGM 16A relative to the cellulose base, with this mixture being laid onto top of the first AGM 16A/cellulose base. This pattern may be repeated using as many forming heads as desired. If desired the final forming head may distribute pure cellulose and no AGM 16A. Generally, the layer from each forming head does not intermix with adjacent layers. Adhesive bonding and/or thermal bonding may hold superposed layers in place and provide structural rigidity.

Suitable core 16 layers and a suitable apparatus and process for making one or more layers of a core 16 having a gradient AGM 16A distribution are found in U.S. Pat. No. 8,603,622 issued Dec. 10, 2013. The teachings of U.S. Pat. No. 8,603,622 are incorporated herein by reference at column 5, lines 8-14 for the teaching of a suitable core 16 layer and at FIGS. 3-4, with the accompanying discussion at column 16, line 41 to column 17, line 59 for the teaching of production devices suitable to make a core 16 layer for the present invention.

If two airlaid cellulose core 16 layers are selected, the lower core layer 16L, juxtaposed with the floor sheet 14, may comprise about 10 to 20 weight percent AGM 16A, with about 15 percent being found suitable. The upper core layer 16U, juxtaposed with the optional back sheet 18, if any, may comprise about 20 to about 30 weight percent AGM 16A, with about 25 percent being found suitable. The total core 16, with all layers thereof considered, may comprise 5 to 50 w %, or 10 to 45 w % AGM 16A, the amount and gradient distribution of AGM 16A being found helpful for the present invention. The percentage of AGM 16A, as described and claimed herein refers to the weight percentage of AGM 16A in that particular core 16 layer (16U or 16L), without regard to the floor sheet 14, back sheet 18, smoothing strip 12 or attachment strips 20.

Each core layer 16L, 16U and particularly the upper core layer 16U may be further stratified to provide greater absorbency benefit. The upper core layer 16U may have three strata, as formed. The strata may comprise 0, 25, and 50 weight percent, monotonically increasing as the back sheet 18, if any, is approached, to provide a gradient distribution.

Generally, it is desired that the upper core layer 16U comprise more AGM 16A, on both an absolute basis and a weight percentage basis than the lower core layer 16L. The arrangement provides the benefit that gel blocking in the lower core layer 16L does not prevent full absorption of liquid from the target surface and that liquids are transported upwardly and away from the floor sheet 14.

Any arrangement that provides more AGM 16A, preferably on an absolute basis or optionally on a weight percentage basis is suitable. Alternatively, either core 16 layer or a single core 16 layer may have increasing AGM 16A concentration in the Z direction.

Any such process, as is known in the art, or arrangement, which provides for increasing AGM 16A in the Z direction as the back sheet 18 is approached is herein considered an AGM 16A gradient. It is to be recognized that the AGM 16A gradient may be smooth, comprise one or more stepwise increments or any combination thereof.

The floor sheet 14 may comprise a discrete apertured nonwoven having a basis weight of about 20 to about 80 gsm and particularly about 28 to 60 gsm. The floor sheet 14 may be hydrophobic and made of synthetic fibers. A suitable floor sheet 14 is a 60 gsm PE/PP discrete apertured spunbond nonwoven available as SofSpan from Fitsea of Simpsonville, SC. The floor sheet 14 may have a contact angle of 101 to 180 degrees with water.

The floor sheet 14 may comprise a smoothing strip 12. The smoothing strip 12 may have a width less than the floor sheet 14 and may comprise at least about 10, 20, 30, 40, 50, 60 or 70% of the floor sheet 14 width. The smoothing strip 12 may have a width of at least 10, 20, 30, 40, 50, 100, 150, 200, 250, mm and less than 70, 80, 100, 200 or 300 mm, with a width of 24 to 44 mm being suitable and a width of 34 mm being preferred.

The smoothing strip 12 may be hydrophilic. As used herein hydrophilic means having a contact angle of 0 to 100 degrees, as measured by the test method set forth herein. The smoothing strip 12 may particularly have a contact angle of 30 to 100 degrees and more particularly 55 to 90 degrees. The smoothing strip 12 may comprise at least 50% cellulosic content to be hydrophilic.

More particularly, a suitable smoothing strip 12 may comprise a laminate of cellulose fibers and synthetic fibers. Such a laminate is believed to be helpful in attaining the performance of the cleaning pads 10 described herein. The cellulose fiber lamina may be outwardly facing, to provide friction and absorbency on the floor. The synthetic fiber layer may be positioned on contacting relationship with the floor sheet 14 to provide integrity during use.

A 23 gsm tissue and 17 gsm polypropylene spunbond hydroentagled, sold as 40 gsm Genesis tissue by Suominen of Helsinki, Finland has been found to be a suitable smoothing strip 12. Another suitable smoothing strip 12 may comprise 28 gsm tissue and 17 gsm polypropylene spunbond hydroentagled, sold as 45 gsm Hydratexture tissue by Suominen.

The smoothing strip 12 may have a surface texture less than 0.5 mm, 0.4 mm or less than 0.3 mm and even be essentially 0 mm. Surface texture is measured as the peak to valley distance, independent of the smoothing strip 12 thickness. A surface texture of less than 0.5 mm is believed to minimize streaking during cleaning, particularly when the floor dries and more particularly when a dark floor dries.

Wipe

The cleaning pad may be in the form of a cleaning wipe. The cleaning wipe may be used as a pre-moistened cleaning wipe or a dry wipe for use with a cleaning composition.

If the cleaning wipe is pre-moistened, it is pre-moistened with a cleaning composition, as described in further detail above, which provides for cleaning of the target surface, such as a floor, but yet does not require a post-cleaning rinsing operation.

The cleaning wipe used in conjunction with this cleaning composition may comprise natural or synthetic fibers. The fibers may be hydrophilic, hydrophobic or a combination thereof, provided that the cleaning wipe is generally absorbent to hold, and express upon demand, the above described cleaning composition. In one embodiment, the cleaning wipe may comprise at least 50 weight percent or at least 70 weight percent cellulose fibers, such as air laid SSK fibers. If desired, the cleaning wipe may comprise plural layers to provide for scrubbing, liquid storage, and other particularized tasks for the cleaning operation. If one or multiple airlaid cellulose core layers are selected, each layer of the core 16 may have a basis weight of at least about 50, 100, 125, 150, 175, 200, or 225 gsm and less than about 300 gsm. The level of airlaid cellulose may be important with respect to the retention and control release of the cleaning solution increasing its mileage with respect to cleaning performance in pre-moistened wipes and reducing flooding at the beginning of the cleaning process. In addition, it may be important formulations that include antibacterials due to their controlled release of the quaternary active ingredient.

A cleaning wipe may have a thickness from about 1 mm to about 5 mm, more preferably about 1.5 mm to about 3.0 mm and most preferably about 1.2 mm.

Optionally, the cleaning wipe may further comprise a scrubbing strip. A scrubbing strip is a portion of the cleaning wipe which provides for more aggressive cleaning of the target surface. A suitable scrubbing strip may comprise a polyolefinic film, such as LDPE, and have outwardly extending perforations, etc. The scrubbing strip may be made and used according to commonly assigned U.S. Pat. Nos. 8,250,700; 8,407,848; D551,409 S and/or D614,408 S. A suitable pre-moistened cleaning wipe maybe made according to the teachings of commonly assigned U.S. Pat. Nos. 6,716,805; D614,408; D629,211 and/or D652,633.

Cleaning Implement

Figure 3:
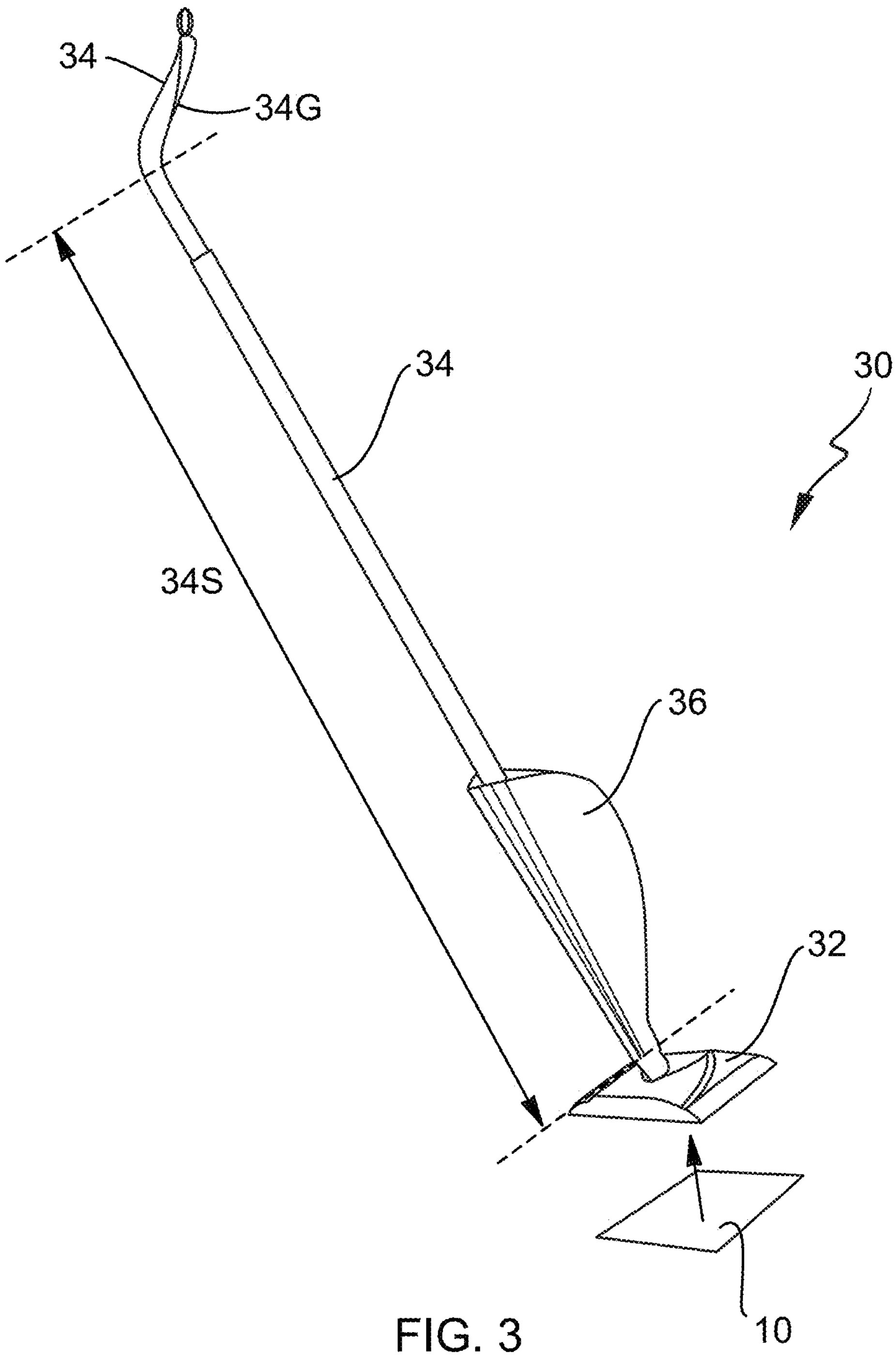
FIG. 3 is a perspective view of a cleaning implement usable with the cleaning pad of the present invention and showing the cleaning pad in position to be removably attached to the cleaning implement.

The cleaning pad 10 and cleaning composition may be used by hand or with a cleaning implement 30. Referring to FIG. 3, the cleaning implement 30 may comprise a plastic head 32 for holding the cleaning pad 10 and an elongate handle 34 connected thereto. The handle 34 may comprise a metal or plastic tube or solid rod.

The head 32 may have a downwardly facing surface, to which the cleaning pad 10 may be attached. The downwardly facing surface may be generally flat, or slightly convex. The head 32 may further have an upwardly facing surface. The upwardly facing surface may have a universal joint to facilitate connection of the elongate handle 34 to the head 32.

A hook and loop system may be used to attach the cleaning pad 10 directly to the bottom of the head. Alternatively, the upwardly facing surface may further comprise a mechanism, such as resilient grippers, for removably attaching the cleaning pad 10 to the implement 30. If grippers are used with the cleaning implement 30, the grippers may be made according to commonly assigned U.S. Pat. Nos. 6,305,046; 6,484,346; 6,651,290 and/or D487,173.

The cleaning implement may further comprise a reservoir for storage of the cleaning composition, a described in further detail above. The reservoir may be replaced when the cleaning composition is depleted and/or refilled as desired. The reservoir may be disposed on the head or the handle of the cleaning implement of the reservoir may be separate from the cleaning implement. The neck of the reservoir may be offset per commonly assigned U.S. Pat. No. 6,390,335. The reservoir may be in the form of a spray bottle.

The cleaning implement 30 may further comprise a pump for dispensing cleaning solution from the reservoir onto the target surface, such as a floor. The pump may be battery powered or operated by line voltage. Alternatively, the cleaning solution may be dispensed by gravity flow. The cleaning solution may be sprayed through one or more nozzles to provide for distribution of the cleaning solution onto the target surface in an efficacious pattern.

If a replaceable reservoir is utilized, the replaceable reservoir may be inverted to provide for gravity flow of the cleaning solution. Or the cleaning solution may be pumped to the dispensing nozzles. The reservoir may be a bottle, and may be made of plastic, such as a polyolefin. The cleaning implement 30 may have a sleeve (36), which removably receives the bottle, or other reservoir. The cleaning implement 30 may have a needle, optionally disposed in the sleeve (36) to receive the cleaning solution from the bottle. The bottle may have a needle pierceable membrane, complementary to the needle, and which is resealed to prevent undesired dripping of the cleaning solution during insertion and removal of the replaceable reservoir. Alternatively or additionally, If desired, the implement 30 may also provide for steam to be delivered to the cleaning pad 10 and/or to the floor or other target surface.

A suitable reservoir of cleaning solution and fitment therefore may be made according to the teachings of commonly assigned U.S. Pat. Nos. 6,386,392, 7,172,099; D388,705; D484,804; D485,178. A suitable cleaning implement 30 may be made according to the teachings of commonly assigned U.S. Pat. Nos. 5,888,006; 5,960,508; 5,988,920; 6,045,622; 6,101,661; 6,142,750; 6,579,023; 6,601,261; 6,722,806; 6,766,552; D477,701 and/or D487,174. A steam implement 30 may be made according to the teachings of jointly assigned 2013/0319463.

Method of Cleaning a Surface

Cleaning pads, cleaning wipes, and cleaning implements using cleaning pads and cleaning wipes may be used along with a liquid hard surface cleaning composition having an advancing contact higher than 30° for cleaning hard surfaces.

Preferably cleaning pads, cleaning wipes, and cleaning implements using cleaning pads and cleaning wipes may be used along with a liquid hard surface cleaning composition having from about 0.001 wt % to about 0.015 wt % of an ethoxylated alkoxylated nonionic surface or a copolymer of the present disclosure and at least about 93 wt % water are suitable for cleaning household surfaces.

More preferably, the liquid hard surface cleaning composition is used with a cleaning pad having a floor sheet with a thickness of less than 1.2 mm or a cleaning wipe having a thickness of less than 1.2 mm. Such combination of cleaning composition and cleaning pad or cleaning wipe provide improved shine, increased absorbency and faster drying.

For general cleaning, especially of floors, a preferred method of cleaning comprises the steps of:

wetting a hard surface with a cleaning composition and removing the cleaning composition from the hard surface by wiping the hard surface with a cleaning pad or cleaning wipe of the present disclosure. The step of wetting the hard surface may involve spraying the hard surface with a liquid hard surface cleaning composition or contacting the hard surface with a pre-moistened wipe or cleaning pad to wet the hard surface. A cleaning implement comprising a pre-moistened or dry cleaning pad or cleaning wipe may also be used to wet and/or remove the cleaning composition from the hard surface.

Test Methods:

A) Shine Test for Floor Cleaning:

The shine test is done with soil mixture which consists of a mixture of consumer relevant soils such as oil, particulates, pet hair, sugar etc. The dark colored engineered hardwood flooring is soiled with the soil mixture and cleaned with the liquid hard surface cleaning composition(s) and a cleaning pad is wiped up and down for a total of six (6) times to cover the entire flooring, after letting them dry, results are analyzed by using grading scale described below.

distortion. A 5-degree lookdown angle is used, so that the line of sight is raised 5 degrees from the horizontal and the baseline of the drop is clearly visible when in contact with the sample. The apparatus has means for direct angle measurements, such as image analysis of the drop dimensions and position on the sample. A FTÅ200 dynamic contact angle video system analyzer manufactured by First Ten Angstroms, Portsmouth, VA has been found suitable. FTÅ software supplied by First Ten Angstroms (Build 362, Version 2.1) has been found suitable. Lighting is adjusted so a clear image is resolvable by the software, to extract the baseline and droplet contour without user input.

The test liquid shall be kept in clean containers.

The substrate used for this testing is an engineered, interlocking tongue and groove planked, hardwood floor with aluminum oxide polyurethane coating. The floor has a contact angle measured with deionized water of 100 degrees+/−15 degrees and has a 60 degrees gloss reading of 85+/−5 Gloss Units. A Home Legend Santos Mahogany Engineered Hardwood floor, UPC 664646301473, has been found suitable. The area of test sample (i.e., floor sheet or smoothing strip) is sufficient to prevent spreading of the test drop to the edge of the sample being tested or drops from contacting each other. The test surface is not directly touched during preparation or testing, to avoid finger contamination. The glossy surface of the floor material is carefully cleaned using an 80/20 deionized water/isopropyl alcohol solution prior to use in any test.

The temperature and humidity of the lab must be controlled to 25° C.±2° C. temperature and 40±5% humidity. Temperature and humidity is recorded during the measurement process.

The wooden flooring substrate is placed onto the specimen holder of the instrument ensuring that the substrate is lying flat and its glossy surface is facing upwards toward the test fluid droplet. A single droplet of 6.5+/−1.5 μL of the test fluid is suspended at the end of a 27 gauge syringe needle. The mounted substrate sample is brought upward until it touches the pendant drop. Droplets should not be dropped or squirted onto the substrate surface. The needle is lowered

| Grading in absolute scale: | and PSU Scale Versus a Reference (average of 3 graders): |
|---|---|
| 0 = as new/no streaks and/or film | 0 = I see no difference |
| 1 = very slight streaks and/or film | 1 = I think there is difference |
| 2 = slight streaks and/or film | 2 = I am sure there is a slight difference |
| 3 = slight to moderate streaks and/or film | 3 = I am sure there is a difference |
| 4 = moderate streaks and/or film | 4 = I am sure there is a big difference |
| 5 = moderate/heavy streaks and/or film | |
| 6 = heavy streaks and/or film | |

B) Fluid Hysteresis—Advancing minus Receding Contact Angle

A contact angle goniometer is used to measure the hysteresis of the fluid. The method described herein below is derived from ASTM D5946-09.

The apparatus for measuring hysteresis and advancing and receding contact angle has: (1) a liquid dispenser capable of suspending a sessile drop, as specified, from the tip of the dispenser, (2) a sample holder that allows a sample to lay flat without unintended wrinkles or distortions, and hold the sample so that the surface being measured is horizontal, (3) provision for bringing the sample and suspended droplet towards each other in a controlled manner to accomplish droplet transfer onto the test surface, and (4) means for capturing a profile image of the drop with minimal into the drop until it is at least 0.5 mm from surface. Images of the profile of the drop are collected at a rate of at least 20 images/s. The test fluid is slowly pumped at a rate of 1 μL/s until 10 μL has been added to the drop. This is the advancing contact angle portion of the test. After waiting 15 seconds, the direction of fluid flow in the syringe is reversed in order to slowly remove test fluid from the droplet on the surface of the sample at −1 μL/s until 10 μL has been removed. This is the receding contact angle portion of the measurement. The flooring substrate is moved, in order to place the next droplet of the test fluid onto a clean, undisturbed area of the substrate, preferably at least 25 mm away from any previous measurements. A total of five contact angle measurements from the advancing and receding portion of the test are taken on the substrate sample using the same test fluid.

The advancing contact angle is extracted from the video immediately after the diameter of the drop expands as test fluid is pumped to the surface by addition through the needle. The drop may glide across the surface. Averaging values during this gliding portion would constitute an advancing contact angle as long as the diameter of the drop is expanding. Test fluid must be added to the drop at 1 μL/s until the diameter increases. Immediately after the expansion in diameter, the contact angle is obtained as an advancing contact angle.

The advancing contact angle of the test fluid is reported as the average advancing contact angle of the five measurements.

The receding contact angle is extracted from the video immediately after the diameter of the drop contracts as test fluid is removed from the surface through the needle. Averaging values during this gliding portion would constitute a receding contact angle as long as the diameter of the drop is contracting. Test fluid must be removed from the drop at 1 μL/s until the diameter decreases. Immediately after the contraction in diameter, the contact angle is obtained as a receding contact angle.

surface. Hysteresis below 10 are hardly noticeable by the consumer's naked eyes and are deemed as having high level of shine and cleanness.

C) pH Measurement:

The pH is measured on the neat composition, at 25° C., using a Sartarius PT-10P pH meter with gel-filled probe (such as the Toledo probe, part number 52 000 100), calibrated according to the instructions manual.

D) Measurement of Quaternary Compound Express Level:

The quantification of express level of the Quaternary Compound is done by High performance liquid chromatography-Charged Aerosol Detector (HPLC-CAD) using an external calibration curve determined at known concentration of quaternary compound. Premoistened pads aged for two weeks are expressed and their solutions analysed by HPLC-CAD. The signal from the HPLC-CAD is compare with the calibration curve to determine the expressed or free unbound concentration of the Quaternary Compound released from the pre-moistened wipe.

EXAMPLES

TABLE 1

| Solvent | Ex 1 Wt % Tripropylene glycol methyl ether (TPM) | Ex 2 Wt % Propylene Glycol N-butyl ether (PnB) | Ex 3 Wt % Dipropylene glycol N-butyl Ether (DPnB) | Ex 4 Wt % Diethylene glycol monohexyl ether (Hexyl CARBIT OL ™ Solvent) | Ex 5 Wt % Ethylene glycol monohexyl ether (Hexyl CELLOS OLVE ™ Solvent) | Ex 6 Wt % Ethylene glycol phenyl ether (EPH) | Ex 7 Wt % Propylene glycol phenyl ether (PPH) | Ex 8 Wt % Dipropylene glycol phenyl ether DiPPh | Ex 9 Wt % Tripropylene glycol phenyl ether (TPPH) |
|---|---|---|---|---|---|---|---|---|---|
| Surface Tension (dyne/cm) | 30 | 27.5 | 28.4 | 29.2 | 27.7 | 42 | 38.1 | 37.7 | 39 |
| HLB | 8.1 | 6.9 | 6.8 | 6.7 | 6.4 | 6.4 | 5.9 | 5.8 | 5.5 |
| pH | 6.5 | 6.5 | 6.5 | 6.5 | 6.5 | 6.5 | 6.5 | 6.5 | 6.5 |
| Minors and Water | to 100% | to 100% | to 100% | to 100% | to 100% | to 100% | to 100% | to 100% | to 100% |
| Shine Result (absolute) | 3 | 2 | 2 | 2 | 1.5 | 1 | 0.5 | 0.5 | 3.5 |
| Shine Result (PSU) | −1.50 | −0.50 | −0.50 | −0.50 | Reference | 0.50 | 1.00 | 1.00 | −2.00 |
| CA Hysteresis (Adv-Rec) | 35 | 25 | 25 | 30 | 30 | 20 | 8 | 10 | 30 |

The hysteresis in calculated from the advancing contact angle minus the receding contact angle and it is reported as the average hysteresis of the five measurements.

Hysteresis that is less than at least 30, more preferably less than at least 20, and most preferably less than 10 is consumer acceptable. Without being bound to theory, the hysteresis of the fluid corelates to the size or appearance of streaks or water marks of the left behind fluid on the cleaned surface.

As shown in Table 1, compositions having 0.05 wt. of amine oxide, 0.01 wt. of polymer Mirapol 300, 0.02 wt. % of Uniquat 2250, 0.5 wt. % of a Propylene glycol n-butyl ether, 0.03% of perfume, 98.5 wt. % water, by weight of the overall composition with 0.4% of the preferred HLB solvents, provide consumer acceptable hysteresis, streaks and shine as compared to composition using solvents outside of the preferred HLB range.

TABLE 2

| | Ex 10 Wt % | Ex 11 Wt % | Ex 12 Wt % | Ex 13 Wt % | Ex 14 Wt % | Ex 15 Wt % | Ex 16 Wt % | Ex 17 Wt % |
|---|---|---|---|---|---|---|---|---|
| Solvent PPH | 0.9 | 0.9 | 0.9 | 0.9 | 0.9 | 0.9 | 0.9 | 0.9 |
| Surfactant Amine Oxide | 0.05 | 0.05 | 0.05 | 0.05 | 0.05 | 0.05 | 0.05 | 0.05 |

TABLE 2-continued

| | Ex 10 Wt % | Ex 11 Wt % | Ex 12 Wt % | Ex 13 Wt % | Ex 14 Wt % | Ex 15 Wt % | Ex 16 Wt % | Ex 17 Wt % |
|---|---|---|---|---|---|---|---|---|
| MEA | 0.0 | 0.03 | 0.015 | 0.01 | 0.005 | 0.0 | 0.0 | 0.0 |
| Citric Acid | 0.0 | 0.0 | 0.0 | 0.0 | 0.0 | 0.03 | 0.09 | 0.15 |
| pH | 6.5 | 10 | 9.5 | 9.0 | 8.0 | 4.5 | 4.0 | 3.5 |
| Minors and Water | to 100% | to 100% | to 100% | to 100% | to 100% | to 100% | to 100% | to 100% |
| Shine Result (absolute) | 0.5 | 2.5 | 1.0 | 1.0 | 0.5 | 0.5 | 0.5 | 0.5 |
| Shine Result (PSU) | Reference | −2.00 | −0.50 | −0.50 | 0.0 | 0.0 | 0.0 | 0.0 |
| Contact Angle Hysteresis (Adv-Rec) | 8 | 30 | 15 | 10 | 8 | 5 | 5 | 8 |

As shown in Table 2, compositions with 0.9 of the preferred solvent Dipropylene glycol phenyl ether having 0.05 wt. of amine oxide, 0.01 wt. of polymer Mirapol 300, 0.02 wt. % of Uniquat 2250, 0.5 wt. % of a Propylene glycol n-butyl ether, 0.03% of perfume, 98.5 wt. % water, by weight of the overall composition, provide consumer acceptable hysteresis, streaks and shine when used in a pH range of 3.5 to 9.5 as compared to composition at pH higher than 10.

TABLE 3

| | Ex 18 Wt % | Ex 19 Wt % | Ex 20 Wt % | Ex 21 Wt % | Ex 22 Wt % | Ex 23 Wt % | Ex 24 Wt % | Ex 25 Wt % | Ex 26 Wt % |
|---|---|---|---|---|---|---|---|---|---|
| Solvent PPH Surfactant | 0.4 | 0.4 | 0.4 | 0.4 | 0.4 | 0.4 | 0.4 | 0.4 | 0.4 |
| Amine Oxide | 0.05 | 0.05 | 0.05 | 0.05 | 0.05 | 0.05 | 0.05 | 0.05 | 0.05 |
| Uniquat 2250 | 0.02 | 0.070 | 0.065 | 0.073 | 0.100 | 0.125 | 0.140 | 0.220 | 0.280 |
| gsm of Pulp in pad | 148 | 0.0 | 80 | 111 | 111 | 136 | 148 | 148 | 148 |
| pH | 5.0 | 5.0 | 5.0 | 5.0 | 5.0 | 5.0 | 5.0 | 5.0 | 5.0 |
| Minors and Water | to 100% | to 100% | to 100% | to 100% | to 100% | to 100% | to 100% | to 100% | to 100% |
| Uniquat 2250 Express Level (PPM) | 5 | 670 | 200 | 220 | 300 | 320 | 300 | 470 | 650 |
| Micro Efficacy | Fail | Pass | Pass | Pass | Pass | Pass | Pass | Pass | Pass |
| Shine Result (absolute) | 0.5 | 2.5 | 1.0 | 0.5 | 1.0 | 0.5 | 0.5 | 1.0 | 2.5 |
| Shine Result (PSU) | Reference | −2.00 | −0.50 | 0.0 | −0.50 | 0.0 | 0.0 | −0.50 | −2.00 |
| CA Hysteresis (Adv-Rec) | 8 | 40 | 12 | 8 | 12 | 5 | 8 | 15 | 30 |

As shown in Table 3, pre-moistened wipes with 0.4 of the preferred solvent Dipropylene glycol phenyl ether and Uniquat 2250 between 700 to 2200 ppm, having 0.05 wt. of amine oxide, 0.02 wt. of polymer Mirapol 300, 0.5 wt. % of a Propylene glycol n-butyl ether, and 0.03% of perfume, by weight of the overall composition, provide consumer acceptable hysteresis, resulting in improved streaks and shine in addition to micro efficacy benefits when used in a premoistened pad containing cellulose between 80 to 148 gsm over a pure synthetic pad or non-cellulose containing pad when the expressed or release level of Uniquat is between 200 and 600 ppm.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A disposable premoistened pad for cleaning hard surfaces comprising:

a liquid hard surface cleaning composition comprising:

0.01 wt. % to 7 wt. % of a solvent selected from dipropylene glycol phenyl ether, dipropylene glycol n-butyl ether, or combinations thereof;

from about 0.005 wt. % to about 0.5 wt. % non-ionic surfactant;

from about 0.005 wt. % to 2 wt. % of didecyldimethylammonium chloride; and at least 92 wt. % water, wherein the cleaning composition has a pH from about 4.5 to 6.5;

wherein the pad comprises cellulose, wherein the cellulose content of the pad as basis weight is between 80 to 148 gsm; wherein the pad is impregnated with said cleaning composition.

2. The disposable premoistened pad of claim 1, wherein the pad releases the didecyldimethylammonium chloride at between 200 to 600 ppm.

3. The disposable premoistened pad according to claim 1, wherein the nonionic surfactant is provide at a level from about 0.005 wt. % to about 0.2 wt. % non-ionic surfactant.

4. The disposable premoistened pad according to claim 1, wherein the didecyldimethylammonium chloride is provided at a level from about 0.005 wt % to 0.1 wt % of didecyldimethylammonium chloride.

5. The disposable premoistened pad according to claim 1, wherein the water is in an amount from 97% to 99.5%, by weight of the cleaning composition.

6. A cleaning implement comprising:

a handle;

a plastic head; and the pad according to claim 1 removably connectable with the plastic head.

7. The disposable premoistened pad according to claim 1, wherein said solvent is present at a level from 0.05 wt. % to 3.50 wt. % of the overall composition.

8. A disposable premoistened pad comprising:

a cleaning composition comprising:

0.01 wt. % to 7 wt. % of a solvent selected from propylene glycol phenyl ether, dipropylene glycol phenyl ether, propylene glycol n-butyl ether, dipropylene glycol n-butyl ether, or combinations thereof;

from about 0.005 wt. % to about 0.5 wt. % non-ionic surfactant;

from about 0.005 wt. % to 2 wt. % of an antibacterial, wherein said antibacterial consists of didecyldimethylammonium chloride; and at least 92 wt. % water, wherein the cleaning composition has a pH from about 4.5 to 6.5;

wherein the pad comprises cellulose, wherein the cellulose content of the pad as basis weight is between 80 to 148 gsm. wherein the pad is impregnated with said cleaning composition.

9. The disposable premoistened pad according to claim 8, wherein the cleaning composition further comprises perfume.

10. The disposable premoistened pad according to claim 8, wherein said solvent is present at a level from 0.05 wt. % to 3.50 wt. % of the overall composition.

11. A method of improving shine of a hard surface, comprising the steps of:

a. wetting the hard surface with the cleaning composition of claim 1 and b. removing the cleaning composition from the hard surface with a disposable dry-cleaning wipe.

12. The method of claim 11, wherein the composition comprises less than 0.5 wt. % ethanol.

* * * * *